United States Patent
Li et al.

(10) Patent No.: US 11,909,600 B2
(45) Date of Patent: Feb. 20, 2024

(54) INTENT NEGOTIATION METHOD AND APPARATUS

(71) Applicant: Huawei Technologies Co., Ltd., Shenzhen (CN)

(72) Inventors: Xianming Li, Shanghai (CN); Yijun Yu, Dongguan (CN); Min Ju, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/156,759

(22) Filed: Jan. 19, 2023

(65) Prior Publication Data

US 2023/0164034 A1 May 25, 2023

Related U.S. Application Data

(63) Continuation of application No. PCT/CN2021/109016, filed on Jul. 28, 2021.

(30) Foreign Application Priority Data

Jul. 29, 2020 (CN) .......................... 202010746516.6

(51) Int. Cl.
*H04L 41/142* (2022.01)
*H04L 41/0894* (2022.01)
*G06F 40/40* (2020.01)

(52) U.S. Cl.
CPC ........ *H04L 41/142* (2013.01); *H04L 41/0894* (2022.05); *G06F 40/40* (2020.01)

(58) Field of Classification Search
CPC ... H04L 41/142; H04L 41/0894; H04L 41/00; H04L 41/34; H04L 41/0803; G06F 40/40
See application file for complete search history.

(56) References Cited

U.S. PATENT DOCUMENTS

| 2011/0029541 A1 | 2/2011 | Schulman |
| 2014/0380286 A1* | 12/2014 | Gabel ..................... G06F 8/20 |
| | | 717/139 |
| 2016/0149760 A1 | 5/2016 | Voit et al. |

(Continued)

FOREIGN PATENT DOCUMENTS

| CN | 105912928 A | 8/2016 |
| CN | 109495907 A | 3/2019 |
| CN | 110086677 A | 8/2019 |

(Continued)

OTHER PUBLICATIONS

3GPP TR 28.812 V0. 10.0 (Mar. 2020), 3rd Generation Partnership Project; Technical Specification Group Services and System Aspects; Telecommunication management; Study on scenarios for Intent driven management services for mobile networks (Release 16), 48 pages.

*Primary Examiner* — Benjamin M Thieu
(74) *Attorney, Agent, or Firm* — Slater Matsil, LLP

(57) ABSTRACT

An intent negotiation method and apparatus are provided. The method includes: A first network element sends a first sub-intent of a first intent to a second network element, and sends a second sub-intent of the first intent and indication information to the second network element, where the indication information is used to indicate that the first sub-intent and the second sub-intent have a same action and a same object.

14 Claims, 26 Drawing Sheets

(56) References Cited

U.S. PATENT DOCUMENTS

| | | | |
|---|---|---|---|
| 2019/0182220 A1 | 6/2019 | Resch et al. | |
| 2022/0107802 A1* | 4/2022 | Rao | G06F 16/907 |

FOREIGN PATENT DOCUMENTS

| | | | |
|---|---|---|---|
| CN | 110166305 A | 8/2019 | |
| CN | 110198237 A | 9/2019 | |
| CN | 106789278 B | 11/2019 | |
| CN | 110461011 A | 11/2019 | |
| CN | 110741602 A | 1/2020 | |
| CN | 110990710 A | 4/2020 | |
| CN | 111090733 A | 5/2020 | |
| CN | 111277442 A | 6/2020 | |
| CN | 111382241 A | 7/2020 | |
| CN | 111385110 A | 7/2020 | |

\* cited by examiner

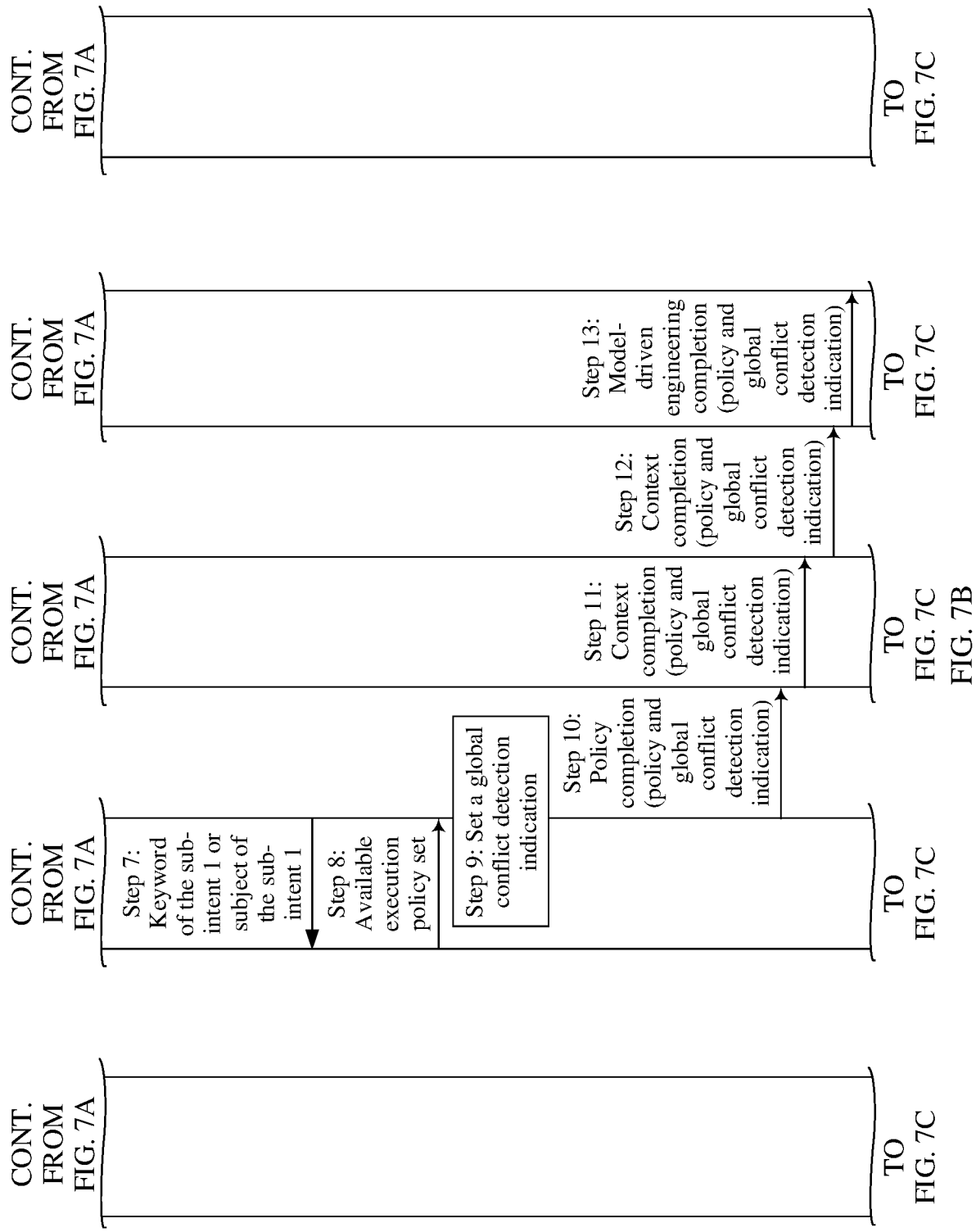

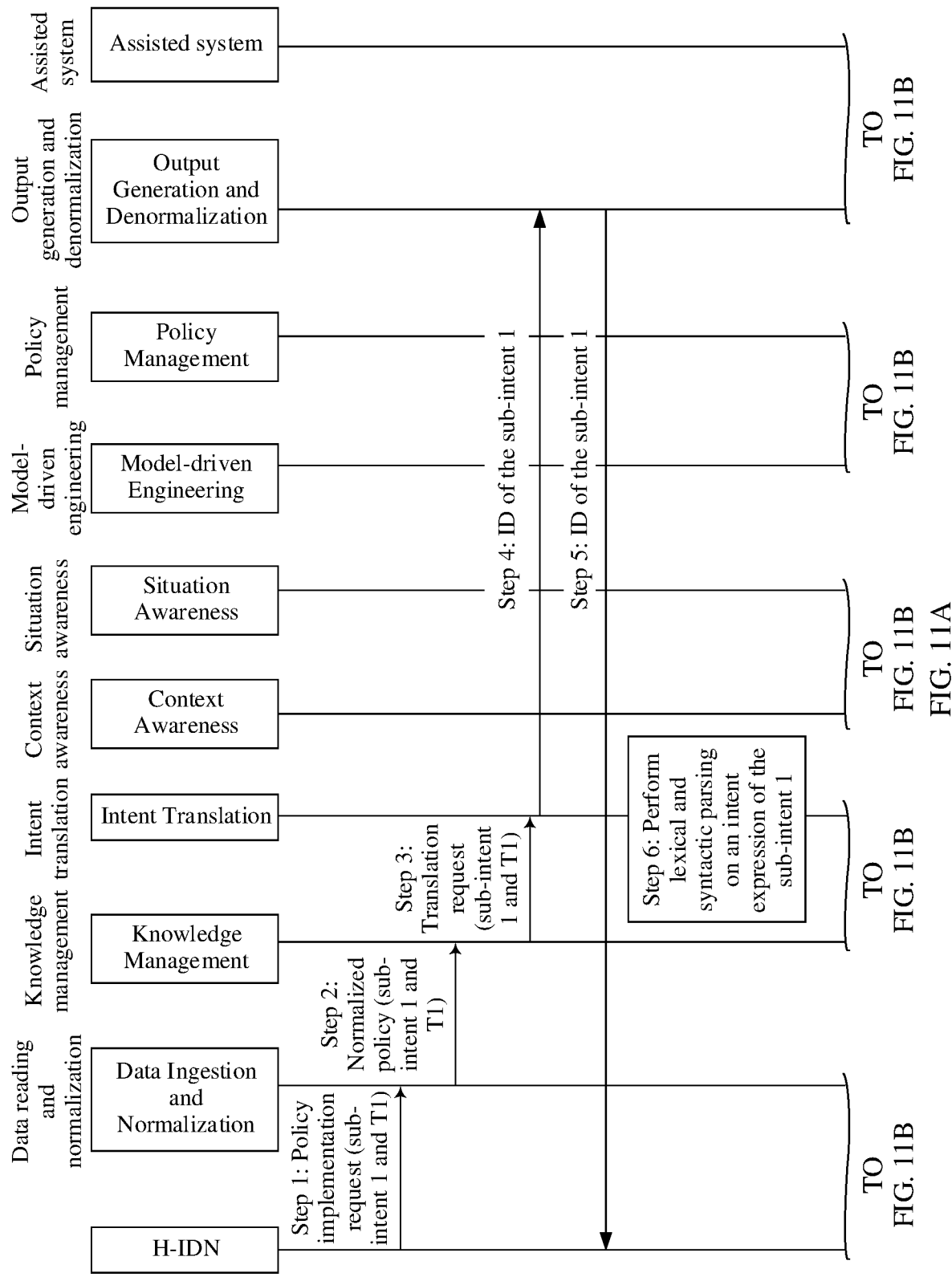

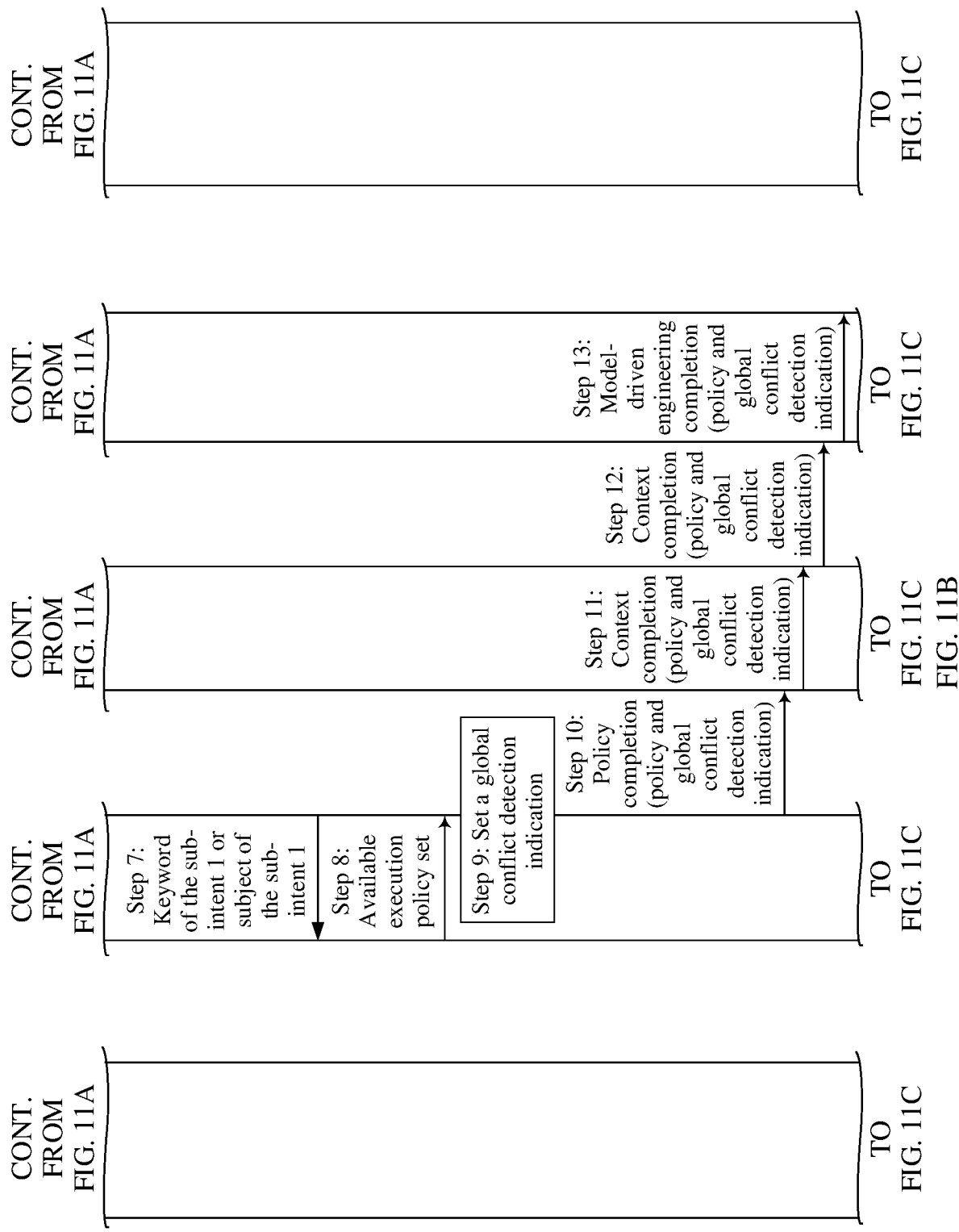

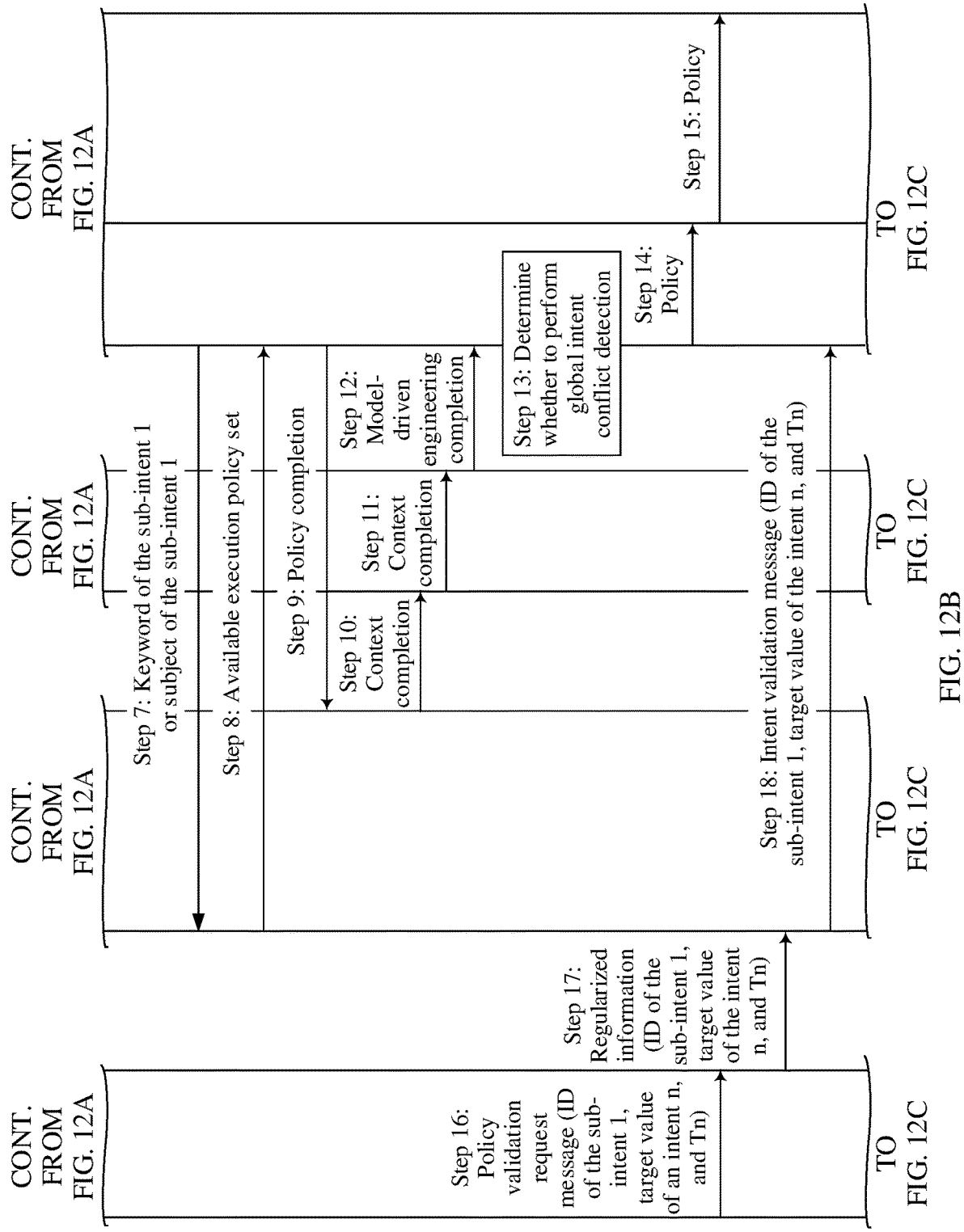

INTENT NEGOTIATION METHOD AND APPARATUS

CROSS-REFERENCE TO RELATED APPLICATIONS

This application is a continuation of International Patent Application No. PCT/CN2021/109016 filed on Jul. 28, 2021, which claims priority to Chinese Patent Application No. 202010746516.6 filed on Jul. 29, 2020. The disclosures of the aforementioned applications are hereby incorporated by reference in their entireties.

TECHNICAL FIELD

Embodiments of this application relate to the field of network management technologies, and in particular, to an intent negotiation method and apparatus.

BACKGROUND

In February 2017, an intent-based network white paper was released. The white paper holds that an intent-based network can help reduce operating expense (OPEX), build a simplified intelligent network, and support operation and maintenance of a network with massive connections. The white paper also proposes that an intent-based network system needs to provide four functions: translation and validation, automated implementation, awareness of a network state, and dynamic optimization assurance and remediation. FIG. 1 shows a Gartner intent-driven network.

In a hierarchical intent system scenario, after receiving an intent from a management personnel or a higher-level intent-driven network, a high-level intent-driven network (H-IDN) decomposes the intent and sends a sub-intent obtained through decomposition to a low-level intent-driven network (L-IDN). Operation objects (for example, network elements) corresponding to the intent are managed by different L-IDNs, as shown in FIG. 2A. After executing the intent, the L-IDN sends feedback information to the H-IDN. The H-IDN re-decomposes the intent based on feedback information reported by each L-IDN. A specific procedure is shown in FIG. 2B.

Step 1: The H-IDN receives the intent.

Step 2: The H-IDN decomposes a target value of the intent into target values of sub-intents of L-IDNs.

An optimization intent is used as an example. During intent decomposition, it only needs to be ensured that a comprehensive result (for example, a sum or an average value) of target values of sub-intents obtained through decomposition meets a target value of the intent. Therefore, a target value of each sub-intent may be any value.

Steps 3 to 5: The H-IDN sends a plurality of sub-intents to the corresponding L-IDNs respectively.

Steps 6 to 8: After receiving the sub-intent, the L-IDN executes the sub-intent, and sends feedback information to the H-IDN. If the sub-intent is not achieved, the feedback information may include a currently reached measurement value. Alternatively, if the sub-intent is achieved, the feedback information may include a measurement value that can be reached and that is estimated by the L-IDN based on a network state and historical data.

Step 9: The H-IDN determines, based on the feedback information reported by each L-IDN, whether the intent is achieved. If the intent is not achieved, the H-IDN re-decomposes the intent, and determines a target value of an updated sub-intent of each L-IDN. If the intent is achieved, the procedure ends.

Steps 10 to 12: The H-IDN sends a plurality of updated sub-intents to the corresponding L-IDNs respectively.

Steps 13 to 15 repeat steps 6 to 8.

Subsequently, steps 9 to 15 are repeated until the intent is deleted, or intent negotiation times out, or the intent is achieved.

Step 16: The H-IDN reports that the intent is achieved. In this case, each sub-intent is achieved.

Step 17: The H-IDN reports that the intent is not achieved. In this case, each sub-intent is not achieved. Alternatively, a part of the sub-intents are achieved, but the other part of the sub-intents are not achieved.

It can be learned from the foregoing procedure that, an existing intent negotiation solution causes a large waste of resources on an L-IDN side. Specifically, in an intent negotiation process, a sub-intent delivered each time differs only in a target value, but the L-IDN needs to perform complete lexical and syntactic parsing on an intent expression of the sub-intent each time. In addition, the sub-intent delivered each time may correspond to a same available execution policy set in an intent knowledge repository. However, the L-IDN needs to perform intent translation each time, in other words, needs to determine the available execution policy set in the intent knowledge repository each time.

SUMMARY

Embodiments of this application provide an intent negotiation method and apparatus, to resolve a problem that an existing intent negotiation solution causes a large waste of resources on an L-IDN side.

According to a first aspect, an embodiment of this application provides an intent negotiation method. The method includes: A first network element sends a first sub-intent of a first intent to a second network element. The first network element sends a second sub-intent of the first intent and indication information to the second network element, where the indication information is used to indicate that the first sub-intent and the second sub-intent have a same action and a same object.

The foregoing method may be used to resolve a problem that an existing intent negotiation solution causes a large waste of resources on an L-IDN side. The second network element may not repeatedly perform complete lexical and syntactic analysis and obtaining of an available execution policy set. Therefore, system resources can be saved.

In a possible design, the method further includes: The first network element sends an estimated quantity of times to the second network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

According to the foregoing design, in a subsequent intent negotiation process, the second network element may determine whether global conflict detection needs to be performed. After the second network element performs global conflict detection, the second network element does not need to perform intent conflict detection for a determined policy each time, and may directly determine, based on a conflict sub-intent set, a conflict intent ID list corresponding to current measurement. Therefore, system resources can be saved, and system efficiency can be improved.

In a possible design, the method further includes: The first network element stores a quantity of negotiation times of the first intent when the first network element determines that the first intent is achieved, or negotiation for the first intent times out, or the first intent is deleted.

According to the foregoing design, the first network element may store the quantity of negotiation times of the first intent, to provide a reference for determining an estimated quantity of times of another intent when the another intent that is the same as the first intent is executed next time.

According to a second aspect, an embodiment of this application provides an intent negotiation method. The method includes: A first network element receives first information from a third network element, where the first information includes first indication information and second indication information, the first indication information is used to indicate that a first sub-intent is achieved, the second indication information is used to indicate a second sub-intent that conflicts with the first sub-intent, and the first sub-intent is all sub-intents that are used to achieve an intent. The first network element sends a third sub-intent to the third network element, where the third sub-intent is different from the first sub-intent, and the third sub-intent is all sub-intents that are used to achieve the intent. The first network element receives second information from the third network element, where the second information includes third indication information and fourth indication information, the third indication information is used to indicate that the third sub-intent is achieved, and the fourth indication information is used to indicate a fourth sub-intent that conflicts with the third sub-intent. The first network element determines the first sub-intent as an execution solution of the intent if a total quantity of second sub-intents is less than a total quantity of fourth sub-intents. Alternatively, the first network determines the third sub-intent as the execution solution of the intent if the total quantity of second sub-intents is greater than or equal to the total quantity of fourth sub-intents.

According to the foregoing method, after determining that the intent is achieved, the first network element may re-deliver a sub-intent for a plurality of times, to obtain a plurality of execution solutions and a total quantity of conflicts corresponding to each of the plurality of execution solutions. Further, an allocation solution with a smallest total quantity of conflicts in the plurality of execution solutions can be determined.

According to a third aspect, an embodiment of this application provides an intent negotiation method. The method includes: An intent translation module in a second network element receives a first sub-intent of a first intent from a first network element. The intent translation module receives a second sub-intent of the first intent and indication information from the first network element, where the indication information is used to indicate that the first sub-intent and the second sub-intent have a same action and a same object. The intent translation module omits translation of the second sub-intent based on the indication information.

The foregoing method may be used to resolve a problem that an existing intent negotiation solution causes a large waste of resources on an L-IDN side. The second network element may not repeatedly perform complete lexical and syntactic analysis and obtaining of an available execution policy set. Therefore, system resources can be saved.

In a possible design, the method further includes: The intent translation module determines a target value of the second sub-intent based on the second sub-intent. The intent translation module sends an intent update request to a third network element in the second network element, where the intent update request includes an identifier of a third sub-intent and the target value of the second sub-intent, and the third sub-intent is a 1st sub-intent that is for the first intent and that is received by the intent translation module from the first network element.

According to the foregoing design, the intent translation module may notify the third network element in the second network element of the target value of the second sub-intent.

In a possible design, the method further includes: The intent translation module receives an estimated quantity of times from the first network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

In a possible design, the method further includes: The intent translation module determines, based on a quantity of policies included in an available execution policy set, that the estimated quantity of times is greater than the quantity of policies, where the available execution policy set is determined based on the third sub-intent. The intent translation module sends a global intent conflict detection request to a fourth network element in the second network element, where the global intent conflict detection request is used to request to detect, for each policy in the available execution policy set, whether a sub-intent that conflicts with the policy exists.

According to the foregoing design, the intent translation module may determine whether global intent conflict detection needs to be performed.

According to a fourth aspect, an embodiment of this application provides an intent negotiation method. The method includes: A policy management module in a second network element receives a first sub-intent of a first intent from a first network element. The policy management module receives a second sub-intent of the first intent and indication information from the first network element, where the indication information is used to indicate that the first sub-intent and the second sub-intent have a same action and a same object. The policy management module omits translation of the second sub-intent based on the indication information.

The foregoing method may be used to resolve a problem that an existing intent negotiation solution causes a large waste of resources on an L-IDN side. The second network element may not repeatedly perform complete lexical and syntactic analysis and obtaining of an available execution policy set. Therefore, system resources can be saved.

In a possible design, the method further includes: The policy management module determines a target value of the second sub-intent based on the second sub-intent. The policy management module sends an intent update request to a third network element in the second network element, where the intent update request includes an identifier of a third sub-intent and the target value of the second sub-intent, and the third sub-intent is a 1st sub-intent that is for the first intent and that is received by an intent translation module from the first network element.

According to the foregoing design, the policy management module may notify the third network element in the second network element of the target value of the second sub-intent.

In a possible design, the method further includes: The policy management module receives an estimated quantity of times from the first network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

In a possible design, the method further includes: The policy management module determines, based on a quantity of policies included in an available execution policy set, that the estimated quantity of times is greater than the quantity of policies, where the available execution policy set is determined based on the third sub-intent. The policy management module detects, for each policy in the available execution policy set, whether a sub-intent that conflicts with the second sub-intent exists under a condition of the policy, and determines a conflict sub-intent set, where the conflict sub-intent set includes a sub-intent that conflicts with at least one policy in the available execution policy set.

According to the foregoing design, the policy management module may determine whether global intent conflict detection needs to be performed, and perform global intent conflict detection when determining that the global intent conflict detection needs to be performed.

In a possible design, the method further includes: The policy management module determines a first policy in the available execution measurement set based on the available execution policy set and the target value of the second sub-intent when the second sub-intent is not achieved. The policy management module determines, based on the conflict sub-intent set, a sub-intent that conflicts with the first policy, and invokes a preset method to resolve the sub-intent that conflicts with the first policy. The policy management module sends the first policy to a fourth network element in the second network element.

According to the foregoing design, in a subsequent intent negotiation process, after the policy management module performs global conflict detection, the policy management module does not need to perform intent conflict detection for a determined policy each time, and may directly determine, based on a conflict sub-intent set, a conflict intent ID list corresponding to current measurement. Therefore, system resources can be saved, and system efficiency can be improved.

According to a fifth aspect, an embodiment of this application provides an intent negotiation apparatus. The apparatus includes a transceiver unit and a processing unit. The processing unit invokes the transceiver unit to: send a first sub-intent of a first intent to a second network element; and send a second sub-intent of the first intent and indication information to the second network element, where the indication information is used to indicate that the first sub-intent and the second sub-intent have a same action and a same object.

In a possible design, the processing unit invokes the transceiver unit to: send an estimated quantity of times to the second network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

In a possible design, the processing unit is configured for the first network element to store a quantity of negotiation times of the first intent when determining that the first intent is achieved, or negotiation for the first intent times out, or the first intent is deleted.

According to a sixth aspect, an intent negotiation apparatus is provided. The apparatus includes a transceiver unit and a processing unit. The transceiver unit is configured to receive first information from a third network element, where the first information includes first indication information and second indication information, the first indication information is used to indicate that a first sub-intent is achieved, the second indication information is used to indicate a second sub-intent that conflicts with the first sub-intent, and the first sub-intent is all sub-intents that are used to achieve an intent. The transceiver unit is configured to send a third sub-intent to the third network element, where the third sub-intent is different from the first sub-intent, and the third sub-intent is all sub-intents that are used to achieve the intent. The transceiver unit is configured to receive second information from the third network element, where the second information includes third indication information and fourth indication information, the third indication information is used to indicate that the third sub-intent is achieved, and the fourth indication information is used to indicate a fourth sub-intent that conflicts with the third sub-intent. The processing unit is configured to determine the first sub-intent as an execution solution of the intent if a total quantity of second sub-intents is less than a total quantity of fourth sub-intents. The processing unit is configured to determine the third sub-intent as the execution solution of the intent if the total quantity of second sub-intents is greater than or equal to the total quantity of fourth sub-intents.

According to a seventh aspect, an embodiment of this application provides an intent negotiation apparatus. The apparatus includes a transceiver unit and a processing unit. The transceiver unit is configured to receive a first sub-intent of a first intent from a first network element. The transceiver unit is configured to receive a second sub-intent of the first intent and indication information from the first network element, where the indication information is used to indicate that the first sub-intent and the second sub-intent have a same action and a same object. The processing unit is configured to omit translation of the second sub-intent based on the indication information.

In a possible design, the apparatus further includes: The processing unit is configured to determine a target value of the second sub-intent based on the second sub-intent. The transceiver unit is configured to send an intent update request to a third network element in a second network element, where the intent update request includes an identifier of a third sub-intent and the target value of the second sub-intent, and the third sub-intent is a 1st sub-intent that is for the first intent and that is received by an intent translation module from the first network element.

In a possible design, the apparatus further includes: The transceiver unit is configured to receive an estimated quantity of times from the first network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

In a possible design, the apparatus further includes: The processing unit is configured to determine, based on a quantity of policies included in an available execution policy set, that the estimated quantity of times is greater than the quantity of policies, where the available execution policy set is determined based on the third sub-intent. The transceiver unit is configured to send a global intent conflict detection request to a fourth network element in the second network element, where the global intent conflict detection request is used to request to detect, for each policy in the available execution policy set, whether a sub-intent that conflicts with the policy exists.

According to an eighth aspect, an embodiment of this application provides an intent negotiation apparatus. The apparatus includes a transceiver unit and a processing unit. The transceiver unit is configured to receive a first sub-intent of a first intent from a first network element. The transceiver unit is configured to receive a second sub-intent of the first intent and indication information from the first network element, where the indication information is used to indicate that the first sub-intent and the second sub-intent have a same action and a same object. The processing unit is configured to omit translation of the second sub-intent based on the indication information.

In a possible design, the apparatus further includes: The processing unit is configured to determine a target value of the second sub-intent based on the second sub-intent. The transceiver unit is configured to send an intent update request to a third network element in a second network element, where the intent update request includes an identifier of a third sub-intent and the target value of the second sub-intent, and the third sub-intent is a 1st sub-intent that is for the first intent and that is received by an intent translation module from the first network element.

In a possible design, the apparatus further includes: The transceiver unit is configured to receive an estimated quantity of times from the first network element, where the estimated quantity of times is used to indicate a quantity of negotiation times of a second intent that has a same action and a same object as the first intent, and the quantity of negotiation times is used to indicate a quantity of decomposition times of the second intent in a process of executing the second intent.

In a possible design, the apparatus further includes: The processing unit is configured to determine, based on a quantity of policies included in an available execution policy set, that the estimated quantity of times is greater than the quantity of policies, where the available execution policy set is determined based on the third sub-intent. The processing unit is configured to: detect, for each policy in the available execution policy set, whether a sub-intent that conflicts with the second sub-intent exists under a condition of the policy, and determine a conflict sub-intent set, where the conflict sub-intent set includes a sub-intent that conflicts with at least one policy in the available execution policy set.

In a possible design, the apparatus further includes: The processing unit is configured to determine a first policy in the available execution measurement set based on the available execution policy set and the target value of the second sub-intent when the second sub-intent is not achieved. The processing unit is configured to: determine, based on the conflict sub-intent set, a sub-intent that conflicts with the first policy, and invoke a preset method to resolve the sub-intent that conflicts with the first policy. The transceiver unit is configured to send the first policy to a fourth network element in the second network element.

For technical effects that can be achieved in the fifth aspect to the eighth aspect, refer to the technical effects that can be achieved in corresponding designs in the first aspect to the sixth aspect. Details are not described herein again.

According to a ninth aspect, an embodiment of this application provides an apparatus. The apparatus may include a processing unit, a sending unit, and a receiving unit. It should be understood that the sending unit and the receiving unit herein may alternatively be a transceiver unit.

When the apparatus is a first network element, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the first network element to perform the method in the first aspect or the second aspect. When the apparatus is a chip in the first network element, the processing unit may be a processor, and the sending unit and the receiving unit may be an input/output interface, a pin, a circuit, or the like. The processing unit executes instructions stored in a storage unit, to enable the chip to perform the method in the first aspect or the second aspect. The storage unit is configured to store the instructions. The storage unit may be a storage unit (for example, a register or a cache) in the chip, or may be a storage unit (for example, a read-only memory or a random access memory) that is in the first network element and that is located outside the chip.

When the apparatus is an intent translation module, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the intent translation module to perform the method in the third aspect. When the apparatus is a chip in the intent translation module, the processing unit may be a processor, and the sending unit and the receiving unit may be an input/output interface, a pin, a circuit, or the like. The processing unit executes instructions stored in a storage unit, to enable the chip to perform the method in the third aspect. The storage unit is configured to store the instructions. The storage unit may be a storage unit (for example, a register or a cache) in the chip, or may be a storage unit (for example, a read-only memory or a random access memory) that is in the intent translation module and that is located outside the chip.

When the apparatus is a policy management module, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the policy management module to perform the method in the fourth aspect. When the apparatus is a chip in the policy management module, the processing unit may be a processor, and the sending unit and the receiving unit may be an input/output interface, a pin, a circuit, or the like. The processing unit executes instructions stored in a storage unit, to enable the chip to perform the method in the fourth aspect. The storage unit is configured to store the instructions. The storage unit may be a storage unit (for example, a register or a cache) in the chip, or may be a storage unit (for example, a read-only memory or a random access memory) that is in the policy management module and that is located outside the chip.

According to a tenth aspect, this application further provides a computer-readable storage medium. The computer-readable storage medium stores a computer program. When the computer program is run on a computer, the computer is enabled to perform the method in the first aspect, the second aspect, the third aspect, or the fourth aspect.

According to an eleventh aspect, this application further provides a computer program product including a program.

When the computer program product runs on a computer, the computer is enabled to perform the method in the first aspect, the second aspect, the third aspect, or the fourth aspect.

According to a twelfth aspect, this application further provides an apparatus, including a processor and a memory. The memory is configured to store computer-executable instructions. The processor is configured to execute the computer-executable instructions stored in the memory, to enable the apparatus to perform the method in the first aspect, the second aspect, the third aspect, or the fourth aspect.

According to a thirteenth aspect, this application further provides an apparatus, including a processor and an interface circuit. The interface circuit is configured to receive code instructions and transmit the code instructions to the processor. The processor runs the code instructions to perform the method in the first aspect, the second aspect, the third aspect, or the fourth aspect.

BRIEF DESCRIPTION OF THE DRAWINGS

FIG. 7A to FIG. 7C are a first flowchart of executing an intent by an L-IDN when an Intent Translation module is used as an independent functional module of an architecture according to this application;

FIG. 11A to FIG. 11C are a second flowchart of executing an intent by an L-IDN when an Intent Translation module is used as an independent functional module of an architecture according to this application;

FIG. 12A to FIG. 12C are a first flowchart of executing an intent by an L-IDN when a Policy Management has an intent translation function according to this application;

DETAILED DESCRIPTION OF ILLUSTRATIVE EMBODIMENTS

Figure 1:
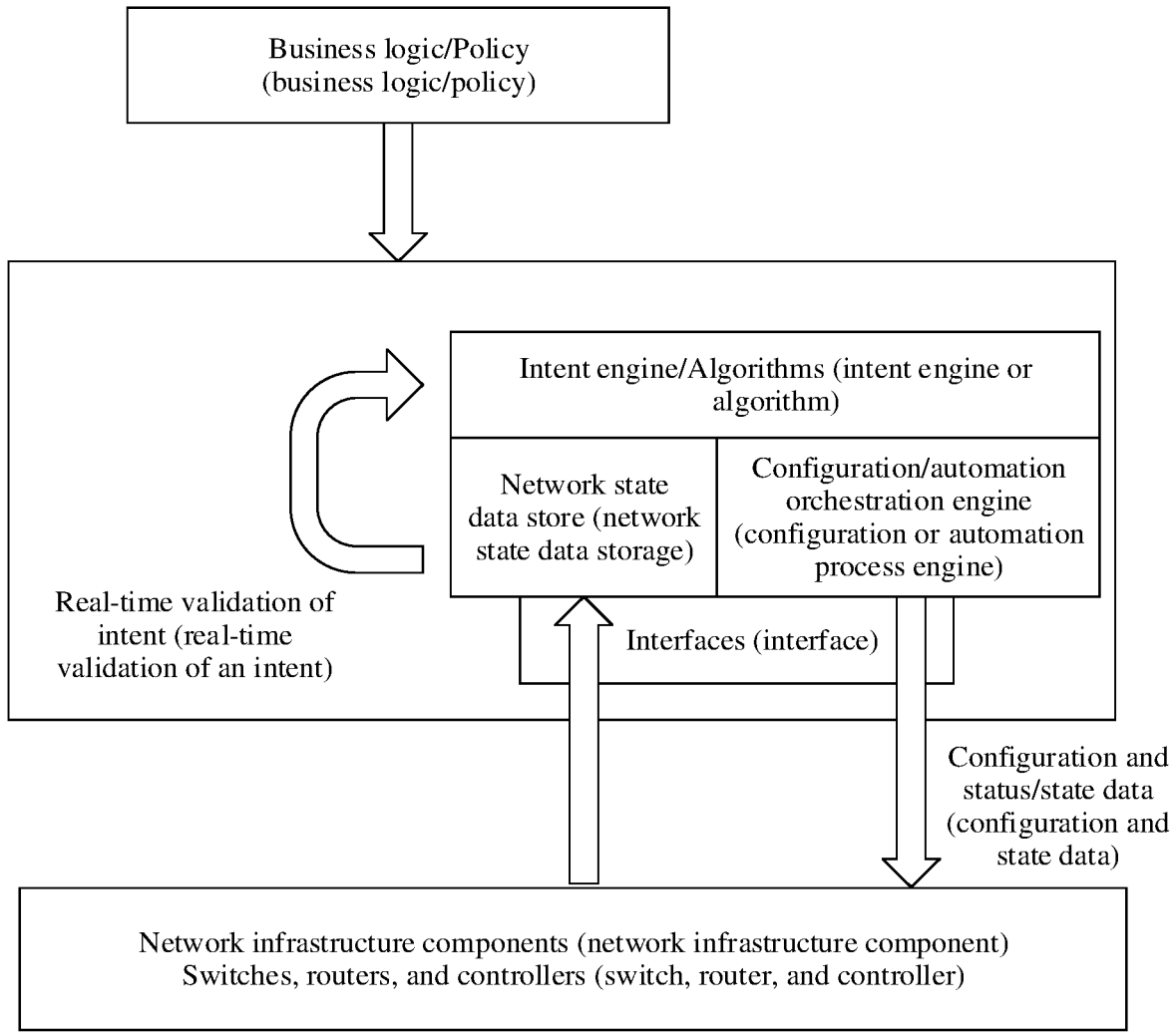
FIG. 1 is a schematic diagram of an intent-driven network according to this application.
Figure 2A:
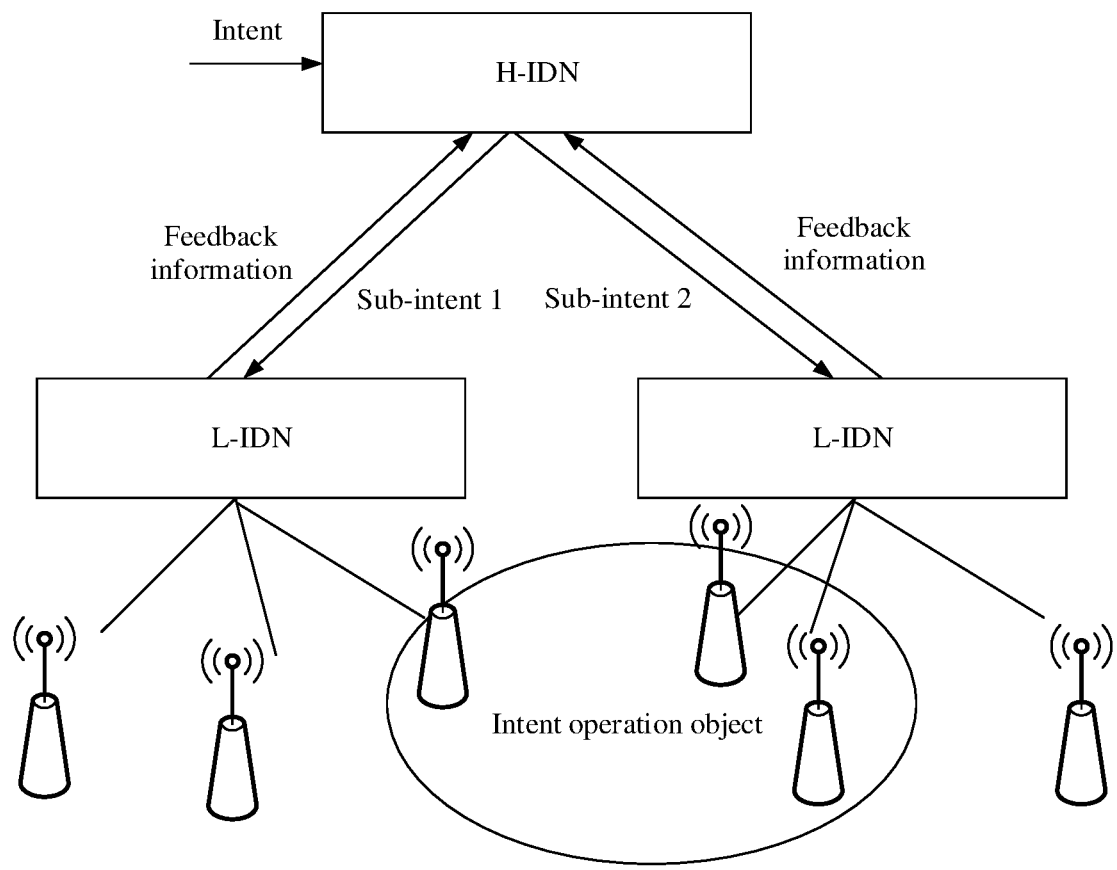
FIG. 2A is a schematic diagram of intent negotiation according to this application.
Figure 2B:
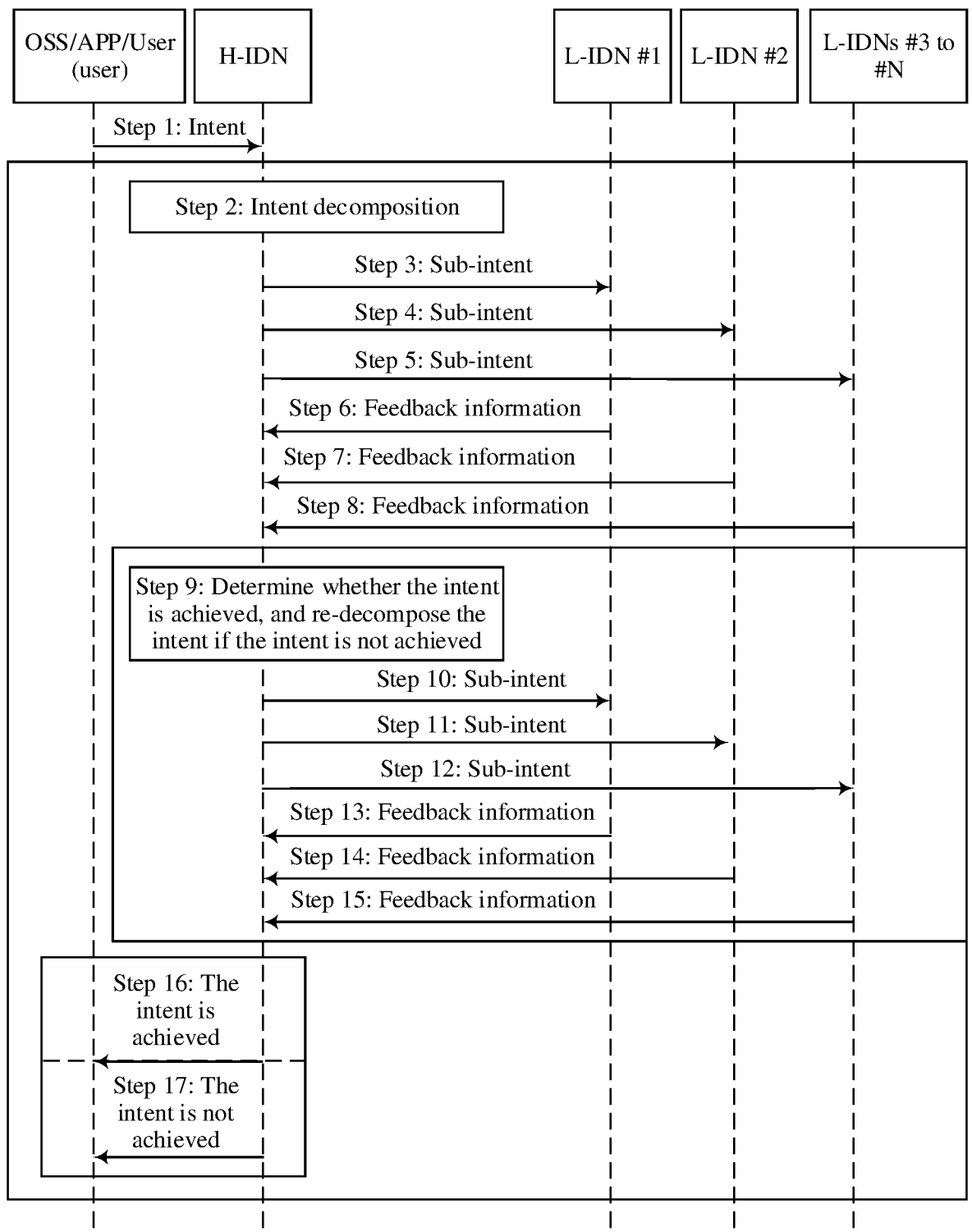
FIG. 2B) is a flowchart of intent negotiation according to this application.

The following briefly describes technical terms involved in embodiments of this application.

1. H-IDN and L-IDN

The H-IDN may provide an intent management function with a high abstraction level, and may deliver an intent with a low abstraction level to a low-layer intent subsystem. The H-IDN may be developed and deployed as an independent software system or enhanced on the basis of a network management system (NMS) of an operator.

The L-IDN may provide an intent management function with a low abstraction level, and may deliver an intent with a low abstraction level to a lower-layer intent subsystem, or deliver a management command to a network element. Functional modules in the L-IDN may be developed and deployed as independent software systems or enhanced on the basis of an element management system (EMS) of a network device.

2. Intent and Related Concepts

The intent is a declarative policy. An intent expression includes only a description of a purpose. A specific implementation method of the intent is obtained and performed by a system through lexical and syntactic parsing and translation. For example, the intent expression may carry a target value (for example, a delay <5 ms), and the system may select, based on different target values, different policies from an available execution policy set determined based on the intent. For example, the intent expression includes an action and an object (which are also referred to as an operation object). The action is a network operation that is abstracted and simplified based on an intent requirement, and includes an action name (IDA name) and a series of related properties (IDA Properties). The object is management object information provided based on the intent requirement, and includes an object name (IDO Name) and a series of properties (IDO Properties) used to identify the object. The target value of the intent may be included in the action or the object. Alternatively, the intent expression includes the action, the object, and the target value. For example, the intent is to optimize a downlink rate of a cell. The action is "optimize", the object is "cell", and the target value is a specific value of the downlink rate of the cell.

An H-IDN may determine, based on feedback information reported by an L-IDN, whether the intent is achieved. If the intent is not achieved, the H-IDN re-decomposes the intent and delivers a sub-intent obtained through re-decomposition. One time of intent negotiation starts when the H-IDN delivers a sub-intent and ends when the H-IDN receives feedback information reported by the L-IDN. Intent achievement is equivalent to achievement of a sub-intent corresponding to each L-IDN.

If policies corresponding to two intents include mutually exclusive operations on a same parameter and/or property of a same network element, it is considered that the two intents conflict with each other.

Global conflict detection of an intent means that for each policy c in an available execution policy set corresponding to the intent, whether an intent conflict exists, under a condition c, between the intent and all intents that are running in a system is detected.

3. Experiential Networked Intelligence (ENI) Architecture

Figure 3A:
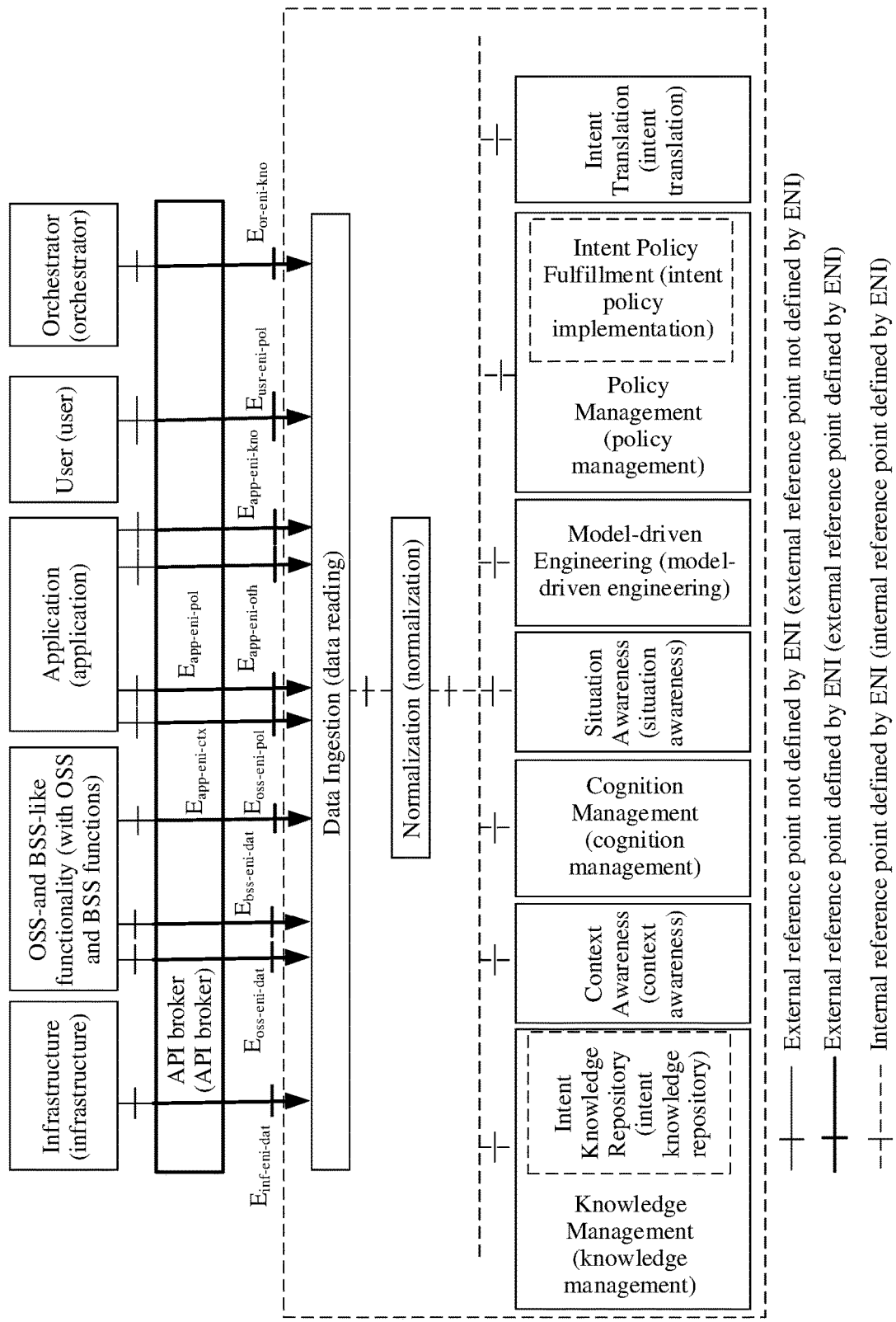
FIG. 3A is a first schematic diagram of a structure of an ENI system according to this application.
Figure 3B:
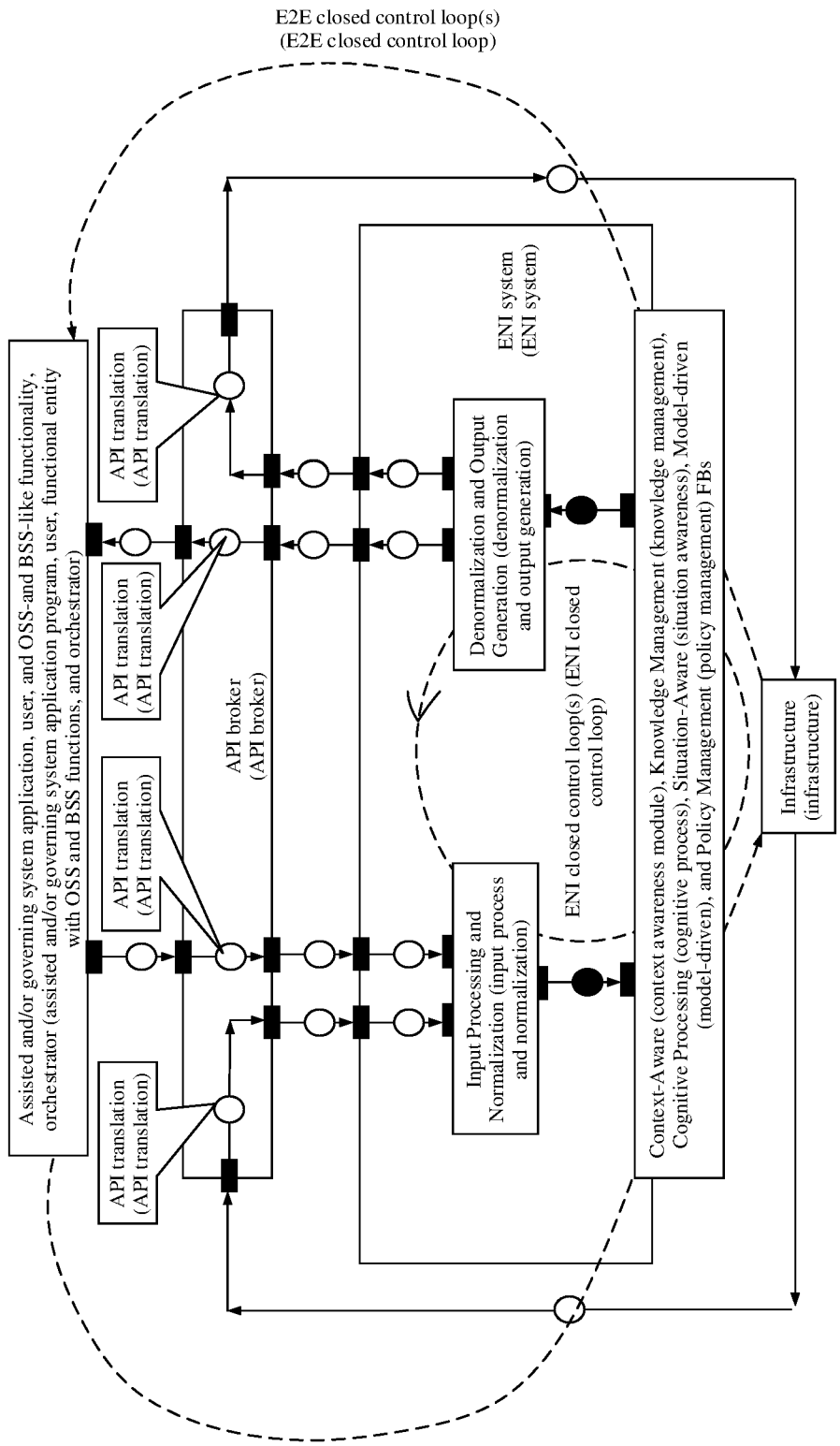
FIG. 3B is a second schematic diagram of a structure of an ENI system according to this application.

The ENI architecture includes 10 functional modules in total, which are classified into four types: input functional modules, output functional modules, analysis functional modules, and decision-making functional modules, as shown in FIG. 3A and FIG. 3B.

The input functional modules (which are data reading and normalization (Data Ingestion and Normalization) modules) are responsible for operations such as receiving data from an external system and normalizing the data. The data reading and normalization modules are two modules.

The output functional modules (which are output generation and denormalization modules) are responsible for converting an internal command in a system into a format that can be processed by the external system and sending the command to the external system.

The analysis functional modules are responsible for sensing and analyzing a current network state and predicting a future network state. The analysis functional modules include a knowledge management module, a context awareness module, and a cognition management module.

The knowledge management module is mainly responsible for managing all knowledge within an ENI scope, identifying a policy type of an intent, and storing intent-related knowledge.

The context awareness module is mainly responsible for obtaining a state and environment information of an assisted system, for example, obtaining performance data of a network element (for example, a base station (gNodeB)). The assisted system may be a radio access network element or a core network element (for example, a user plane function (UPF)).

The cognition management module is mainly responsible for understanding of network data and cognition of the network state in an intent maintenance process.

The decision-making functional modules generate a new policy based on the intent, orchestrate the policy, and send an operation command to the output functional modules based on awareness of the network state. The decision-making functional modules include a situation awareness module, a policy management module, and a model-driven engineering module. Alternatively, the decision-making functional modules include a situation awareness module, a policy management module, a model-driven engineering module, and an intent translation module.

The situation awareness module is mainly responsible for sensing impact of a recommendation or a command delivered by an ENI system on the assisted system. For example, the situation awareness module is configured to sense an achievement state of an intent target.

The model-driven engineering module mainly helps convert intent knowledge and context information into a format that can be identified by the policy management module according to a model-driven method.

The policy management module is mainly responsible for generating a policy that ensures intent achievement based on the intent knowledge and the context information and delivering the policy to the assisted system.

The intent translation module is mainly responsible for lexical and syntactic parsing of an intent expression and obtaining of the intent-related knowledge from the knowledge management module based on content of the intent expression.

It may be understood that there are two optional solutions for implementing an intent translation function in the current ENI architecture: (1) Function enhancement is performed based on the policy management module. (2) The intent translation module is used as an independent functional module of the architecture.

Figure 4:
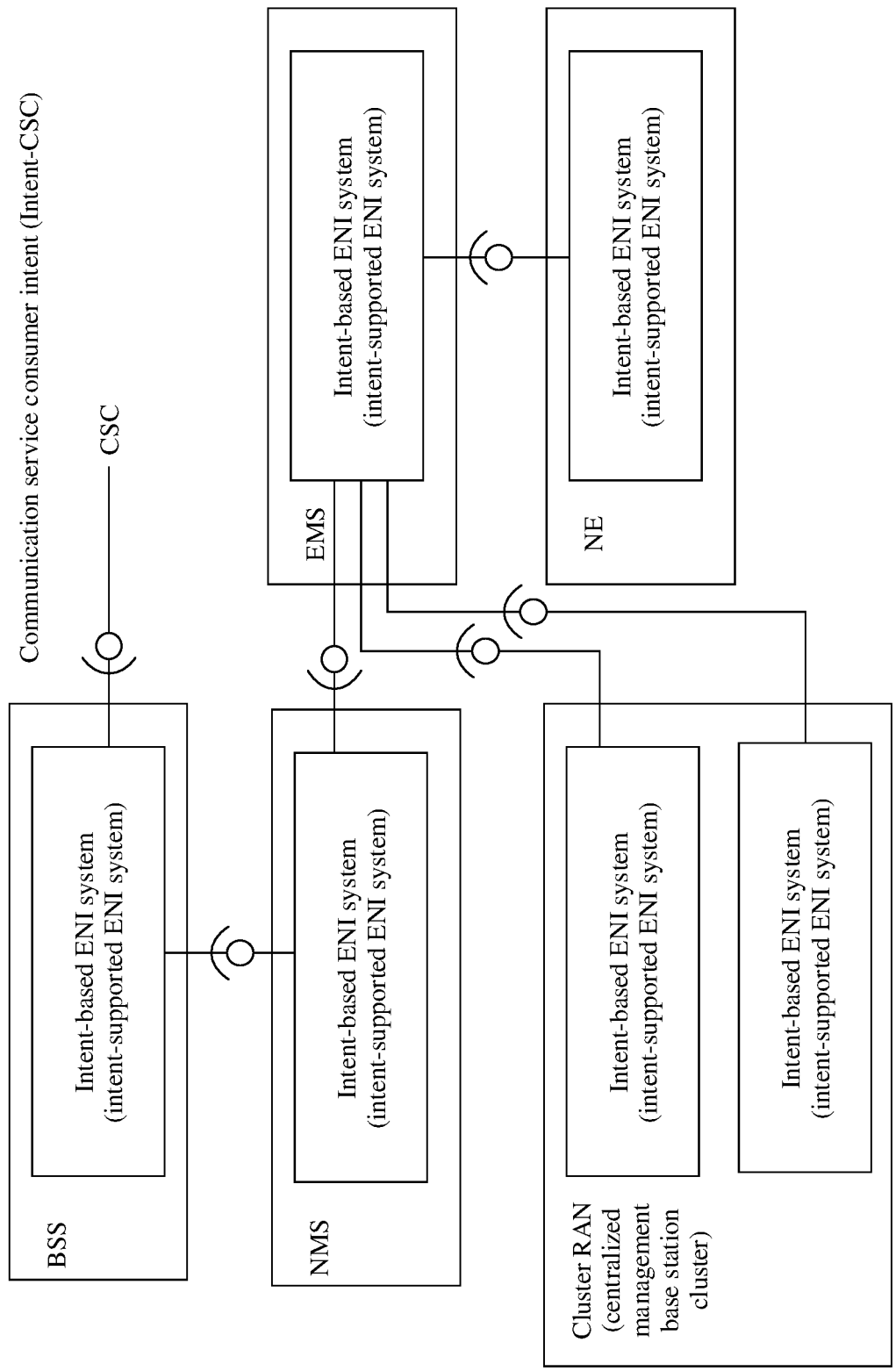
FIG. 4 is a schematic diagram of deployment of an ENI system according to this application.

Specifically, with reference to FIG. 4, the ENI system may be deployed in a wireless network management network element at each layer, as shown in an example 1 to an example 4 below.

Example 1: The ENI system is deployed on a business support system (BSS). The ENI system receives a communication service consumer intent (Intent-CSC) of a communication service consumer (CSC), converts the communication service consumer intent into a communication service provider intent (Intent-CSP), and sends the communication service provider intent to an ENI system on an NMS.

Example 2: The ENI system is deployed on an NMS, and the ENI system receives an Intent-CSP intent from a BSS. If the intent describes an operation and maintenance requirement of the NMS itself, a local data analysis and management and control operation is invoked to execute the intent. If the intent describes an operation and maintenance requirement of a lower-layer EMS or network element, the ENI system decomposes the Intent-CSP into network manager intents (Intent-NOP), and sends the network manager intents to corresponding EMSs.

Example 3: The ENI system is deployed on an EMS, and the ENI system receives an Intent-NOP intent from an NMS. If the intent describes an operation and maintenance requirement of the EMS itself, a local data analysis and management and control operation is invoked to execute the intent. If the intent describes an operation and maintenance requirement of a network device (Network Equipment, NE) with an intent system, for example, a centralized management base station cluster (ClusterRAN) or a cluster, a sub-intent is sent to the NE.

Example 4: The ENI system is deployed on NE (for example, a cluster). The ENI system receives an intent from an EMS through an intent-based southbound interface, translates the intent into an operation and maintenance operation thereof, and invokes a local data analysis and management and control operation through the policy management module to execute and maintain the intent.

Figure 5:
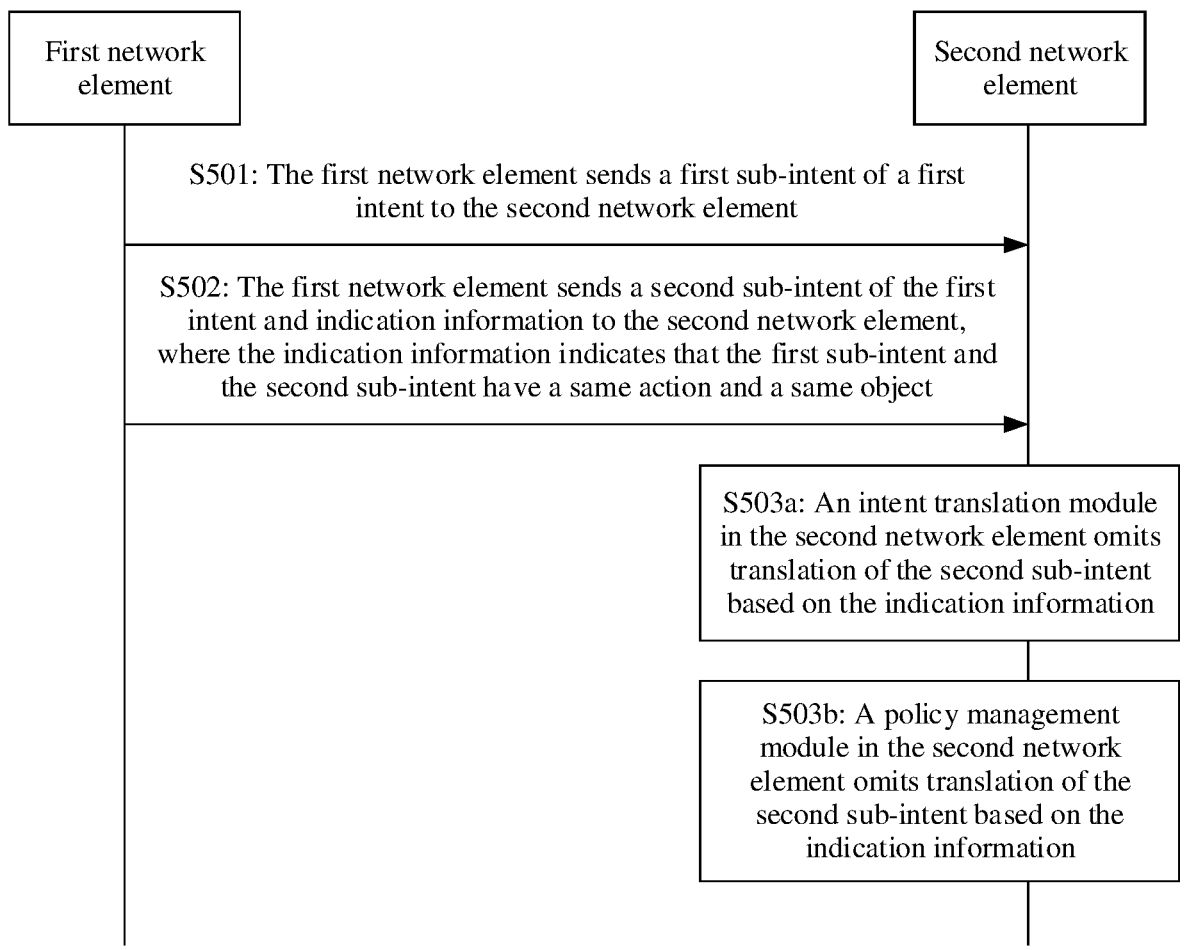
FIG. 5 is a first overview flowchart of an intent negotiation method according to this application.

To resolve a problem that an existing intent negotiation solution causes a large waste of resources on an L-IDN side because only achievement of an intent received by an H-IDN is considered, an embodiment of this application provides an intent negotiation method. As shown in FIG. 5, it may be understood that in this embodiment, a level of an intent management function in a first network element is higher than a level of an intent management function in a second network element. There are one or more second network elements. For example, the first network element may be a network element in which the H-IND is located, and the second network element may be a network element in which an L-IDN is located. The method includes the following steps.

S501: The first network element sends a first sub-intent of a first intent to the second network element.

For example, the first network element may receive the first intent sent by another network element or a management personnel. A level of an intent management function in the another network element is higher than the level of the intent management function in the first network element. For example, the first network element may be an EMS, the second network element may be NE, and the first network element receives an Intent-NOP from an NMS.

In an example, after receiving the first intent, the first network element decomposes the first intent into a plurality of sub-intents. The plurality of sub-intents include the first sub-intent. In other words, the first sub-intent is a sub-intent obtained by the first network element through an initial time of decomposition of the first intent. The first sub-intent is a sub-intent corresponding to the second network element in the plurality of sub-intents obtained through the first time of decomposition.

In another example, the first sub-intent is not the sub-intent obtained by the first network element through the initial time of decomposition of the first intent, but a sub-intent obtained by the first network element through a $k^{th}$ time of decomposition of the first intent, where k is a positive integer greater than 1.

S502: The first network element sends a second sub-intent of the first intent and indication information to the second network element, where the indication information indicates that the first sub-intent and the second sub-intent have a same action and a same object.

It may be understood that the second sub-intent arrives at the second network element after the first sub-intent, and the first sub-intent and the second sub-intent are sub-intents that are for the first intent and that are delivered by the first network element at two consecutive times.

For example, after the second network element receives the first sub-intent, the second network element executes the first sub-intent. When the second network element determines that the first sub-intent is not achieved, the second network element sends feedback information to the first network element. The feedback information indicates that the first sub-intent is not achieved.

It should be noted that the second network element may continuously determine, within a period of time by adjusting a policy, whether the first sub-intent is achieved, and send feedback information to the second network element after each time of determining. Because a network state of an assisted system is not constant, and may change at any time, an achievement state of the first sub-intent indicated by the feedback information reported by the second network element may change. For example, the L-IDN may indicate, in feedback information reported at first several times, that the sub-intent is not achieved, but indicate, in feedback information reported subsequently, that the sub-intent is achieved. For another example, the L-IDN may indicate, in feedback information reported at first several times, that the sub-intent is achieved, but indicate, in feedback information reported subsequently, that the sub-intent is not achieved. Generally, the H-IDN determines, based on feedback information obtained at a last time or feedback information obtained at last several consecutive times that indicates a same completion state of the sub-intent, whether the sub-intent is achieved.

Correspondingly, the first network element receives a plurality of pieces of feedback information from the second network element, and the first network element determines, based on the plurality of pieces of feedback information, that the first intent is not achieved. In this case, the first network element decomposes the first intent to obtain a plurality of sub-intents. The plurality of sub-intents include the second sub-intent.

It may be understood that, when the first sub-intent is the sub-intent obtained by the first network element through the initial time of decomposition of the first intent, the second sub-intent may be a sub-intent obtained by the first network element through a second time of decomposition of the first intent. Alternatively, when the first sub-intent is the sub-intent obtained by the first network element through the $k^{th}$ time of decomposition of the first intent, the second sub-intent may be a sub-intent obtained by the first network element through a $(k+1)^{th}$ time of decomposition of the first intent.

A type of the indication information may be an enumeration type. For example, when the indication information indicates that the first sub-intent and the second sub-intent have the same action and object, a value of the indication information may be TEMP. In addition, when the first network element sends the first sub-intent, the first network element may also send indication information. For example, indication information sent during a non-initial time of sub-intent delivery is referred to as first indication information, and indication information sent during an initial time of sub-intent delivery is referred to as second indication information. In this case, a value of the second indication information is COMMON.

It should be noted that, that the first sub-intent and the second sub-intent have the same action and object may alternatively be described as that the first sub-intent and the second sub-intent only have different target values, or the second sub-intent does not need to be translated or translation of the second sub-intent is omitted.

In addition, in some embodiments, the first network element may further send an estimated quantity of times to the second network element. The preset quantity of times is used to indicate a quantity of negotiation times of a second intent that has a same action and a same object as the first intent. The quantity of negotiation times of the second intent is used to indicate a quantity of decomposition times of the second intent in a process of executing the second intent. It may be understood that there may be one or more second intents. In a process in which the first network element executes the second intent, when determining that the second intent is achieved, or negotiation for the second intent times out, or the second intent is deleted, the first network element stores the quantity of negotiation times of the second intent. Similarly, in a process in which the first network element executes the first intent, when determining that the first intent is achieved, or negotiation for the first intent times out, or the first intent is deleted, the first network element stores a quantity of negotiation times of the first intent. The preset quantity of times is used by the second network element to determine whether to perform global conflict detection.

In an example, the first network element may send the preset quantity of times when initially sending a sub-intent for the first intent to the second network element, and no longer send the preset quantity of times when subsequently sending a sub-intent for the first intent to the second network element. In other words, the first network element sends the preset quantity of times only once. Alternatively, when determining that the preset quantity of times does not need to be updated, the first network element no longer sends the preset quantity of times when subsequently sending a sub-intent for the first intent to the second network.

In an example, the first network element may send the preset quantity of times (which is also referred to as a first preset quantity of times) when initially sending a sub-intent for the first intent to the second network element, and send a second preset quantity of times when sending a sub-intent for the first intent to the second network element at a second time. The second preset quantity of times=the first preset quantity of times−1. It can be learned that the first network element sends a $K^{th}$ preset quantity of times when sending a sub-intent for the first intent to the second network element at a $K^{th}$ time. The $K^{th}$ preset quantity of times=the first preset quantity of times−K+1. K is a positive integer greater than or equal to 2.

In another example, the first network element may send the preset quantity of times (which is also referred to as a first preset quantity of times) when initially sending a sub-intent for the first intent to the second network element. The first network element collects statistics on achievement states of the plurality of sub-intents obtained through the initial time of decomposition of the first intent, and calculates an initial sub-intent achievement ratio corresponding to the first intent. If the initial sub-intent achievement ratio corresponding to the first intent is less than an initial sub-intent achievement ratio corresponding to the second intent, the first network element sends a second preset quantity of times when sending a sub-intent for the first intent to the second network element at a second time. The second preset quantity of times is greater than the first preset quantity of times. For example, if the initial sub-intent achievement ratio corresponding to the first intent is 50%, and the initial sub-intent achievement ratio corresponding to the second sub-intent is 75%, the first network element may send, to the second network element, a quantity of times that is greater than the preset quantity of times that is initially sent.

In some embodiments, in correspondence to the foregoing S501 and S502, on a second network element side, when an intent translation module is used as an independent functional module of an architecture, the intent translation module receives the first sub-intent of the first intent from the first network element, and the intent translation module receives the second sub-intent of the first intent and the indication information from the first network element.

S503a: The intent translation module omits translation of the second sub-intent based on the indication information.

Specifically, the intent translation module determines a target value of the second sub-intent based on the second sub-intent, and sends an intent update request to a third network element in the second network element. The intent update request includes an identifier of a third sub-intent and the target value of the second sub-intent. For example, the third network element may be a situation awareness module in the second network element. The third sub-intent is a $1^{st}$ sub-intent that is for the first intent and that is received by the intent translation module from the first network element. For example, when the first sub-intent is the $1^{st}$ sub-intent for the first intent, the third sub-intent is the first sub-intent.

In an intent negotiation process, the intent translation module may not repeatedly perform complete lexical and syntactic analysis and obtaining of an available execution policy set. Therefore, system resources can be saved.

In addition, after the intent translation module receives the estimated quantity of times from the first network element, the intent translation module determines, based on a quantity of policies included in the available execution policy set, that the estimated quantity of times is greater than the quantity of policies, and sends a global intent conflict detection request to a fourth network element in the second network element. The global intent conflict detection request is used to request to detect, for each policy in the available execution policy set, whether a sub-intent that conflicts with the policy exists. The fourth network element is a policy management module in the second network element, and the available execution policy set is determined based on the third sub-intent.

For example, when the first network element sends the first sub-intent to the second network element, the first network element further sends the estimated quantity of times to the second network element. When the quantity of policies included in the available execution policy set is less than the estimated quantity of times, the intent translation module sends the global intent conflict detection request to the policy management module. The policy management module detects, for each policy in the available execution policy set, whether an intent conflict exists, under the policy, between the first sub-intent and all intents that are running in a system, and determines a conflict sub-intent set. The conflict sub-intent set may also be referred to as a conflict information map, and includes a sub-intent that conflicts with at least one policy in the available execution policy set. For example, the conflict sub-intent set indicates each policy and a conflict intent ID list corresponding to the policy. It may be understood that, under a policy, there may be no intent conflict between the first sub-intent and all the intents that are running in the system.

For example, if the quantity of policies included in the available execution policy set is 5, and the estimated quantity of times is 10, after receiving the global intent conflict detection request from the intent translation module, the policy management module detects, for each of the five policies, whether an intent conflict exists, under the policy, between the first sub-intent and all the intents that are running in the system. It is assumed that under a policy 1, intent conflicts exist between the first sub-intent and three intents that are running in the system; under a policy 2, intent conflicts exist between the first sub-intent and two intents that are running in the system; under a policy 3, no intent conflict exists between the first sub-intent and all the intents that are running in the system; under a policy 4, an intent conflict exists between the first sub-intent and one intent that is running in the system; under a policy 5, no intent conflict exists between the first sub-intent and all the intents that are running in the system. Therefore, the policy management module may determine a conflict sub-intent set. The conflict sub-intent set indicates the policy 1 and an ID list of the three intents corresponding to the policy 1, the policy 2 and an ID list of the two intents corresponding to the policy 2, and the policy 4 and an ID list of the one intent corresponding to the policy 4. Therefore, in a subsequent intent negotiation process, the policy management module does not need to perform intent conflict detection for a determined policy each time, and may directly determine, based on the conflict sub-intent set, a conflict intent ID list corresponding to current measurement. Therefore, system resources can be saved, and system efficiency can be improved.

In some embodiments, in correspondence to the foregoing S501 and S502, on the second network element side, when the policy management module has an intent translation function, the policy management module receives the first sub-intent of the first intent from the first network element, and the policy management module receives the second sub-intent of the first intent and the indication information from the first network element.

S503b: The policy management module omits translation of the second sub-intent based on the indication information.

Specifically, the policy management module determines a target value of the second sub-intent based on the second sub-intent, and sends an intent update request to a third network element in the second network element. The intent update request includes an identifier of a third sub-intent and the target value of the second sub-intent. For example, the third network element may be a situation awareness module in the second network element, and the third sub-intent is a $1^{st}$ sub-intent that is for the first intent and that is received by the policy management module from the first network element. For example, when the first sub-intent is the 1$^{st}$ sub-intent for the first intent, the third sub-intent is the first sub-intent.

Therefore, in an intent negotiation process, the policy management module may not repeatedly perform complete lexical and syntactic analysis and obtaining of an available execution policy set. Therefore, system resources can be saved.

In addition, after the policy management module receives the estimated quantity of times from the first network element, the policy management module determines, based on a quantity of policies included in the available execution policy set, that the estimated quantity of times is greater than the quantity of policies, and performs global conflict detection. The available execution policy set is determined based on the third sub-intent.

For example, when the first network element sends the first sub-intent to the second network element, the first network element further sends the estimated quantity of times to the second network element. After the policy management module receives the estimated quantity of times from the first network element, the policy management module determines, based on the quantity of policies included in the available execution policy set, that the estimated quantity of times is greater than the quantity of policies. The policy management module detects, for each policy in the available execution policy set, whether an intent conflict exists, under the policy, between the first sub-intent and all intents that are running in a system, and determines a conflict sub-intent set. The available execution policy set is determined based on the third sub-intent. The conflict sub-intent set may also be referred to as conflict information map, and includes a sub-intent that conflicts with at least one policy in the available execution policy set. For example, the conflict sub-intent set indicates each policy and a conflict intent ID list corresponding to the policy. It may be understood that, under a policy, there may be no intent conflict between the first sub-intent and all the intents that are running in the system.

For example, if the quantity of policies included in the available execution policy set is 5, and the estimated quantity of times is 10, the policy management module detects, for each of the five policies, whether an intent conflict exists, under the policy, between the first sub-intent and all the intents that are running in the system. It is assumed that under a policy 1, intent conflicts exist between the first sub-intent and three intents that are running in the system; under a policy 2, intent conflicts exist between the first sub-intent and two intents that are running in the system; under a policy 3, no intent conflict exists between the first sub-intent and all the intents that are running in the system; under a policy 4, an intent conflict exists between the first sub-intent and one intent that is running in the system; under a policy 5, no intent conflict exists between the first sub-intent and all the intents that are running in the system. Therefore, the policy management module may determine a conflict sub-intent set. The conflict sub-intent set indicates the policy 1 and an ID list of the three intents corresponding to the policy 1, the policy 2 and an ID list of the two intents corresponding to the policy 2, and the policy 4 and an ID list of the one intent corresponding to the policy 4.

It may be understood that, when the first network element sends the first sub-intent to the second network element, the first network element further sends the estimated quantity of times to the second network element. In addition, the quantity of policies included in the available execution policy set is less than the estimated quantity of times. The policy management module detects, for each policy in the available execution policy set, whether an intent conflict exists, under the policy, between the first sub-intent and all the intents that are running in the system, to obtain a conflict sub-intent set 1. Alternatively, when the first network element sends the second sub-intent to the second network element, the first network element further sends the estimated quantity of times to the second network element. In addition, the quantity of policies included in the available execution policy set is less than the estimated quantity of times. The policy management module detects, for each policy in the available execution policy set, whether an intent conflict exists, under the policy, between the second sub-intent and all intents that are running in the system, to obtain a conflict sub-intent set 2. The conflict sub-intent set 1 is the same as the conflict sub-intent set 2. It can be learned that when the first sub-intent and the second sub-intent have the same action and object, conflict sub-intent sets determined by the policy management module are also the same. Therefore, the policy management module needs to perform global conflict detection only once. In this embodiment of this application, a specific moment for sending the estimated quantity of times is not limited. When receiving the estimated quantity of times, the second network element determines, based on the estimated quantity of times, whether global conflict detection needs to be performed, and the global conflict detection may be performed only once.

In addition, when the estimated quantity of times is less than or equal to the quantity of policies, a quantity of times of intent conflict detection that may need to be performed is less than a quantity of times of global intent conflict detection. Therefore, in this case, the global intent conflict detection does not need to be performed.

Further, when the second sub-intent is not achieved, the policy management module determines a first policy in the available execution measurement set based on the available execution policy set and the target value of the second sub-intent. The policy management module determines, based on the conflict sub-intent set, a sub-intent that conflicts with the first policy, and invokes a preset method to resolve the sub-intent that conflicts with the first policy. The policy management module sends the first policy to the assisted system. Therefore, in a subsequent intent negotiation process, the policy management module does not need to perform intent conflict detection for a determined policy each time, and may directly determine, based on the conflict sub-intent set, a conflict intent ID list corresponding to current measurement. Therefore, system resources can be saved, and system efficiency can be improved.

The following describes the embodiment shown in FIG. 5 with reference to the accompanying drawings. It may be understood that in the following descriptions, a first sub-intent may correspond to the foregoing first sub-intent, a second sub-intent may correspond to the foregoing second sub-intent, and a third sub-intent may correspond to the foregoing third sub-intent.

Figure 6A:
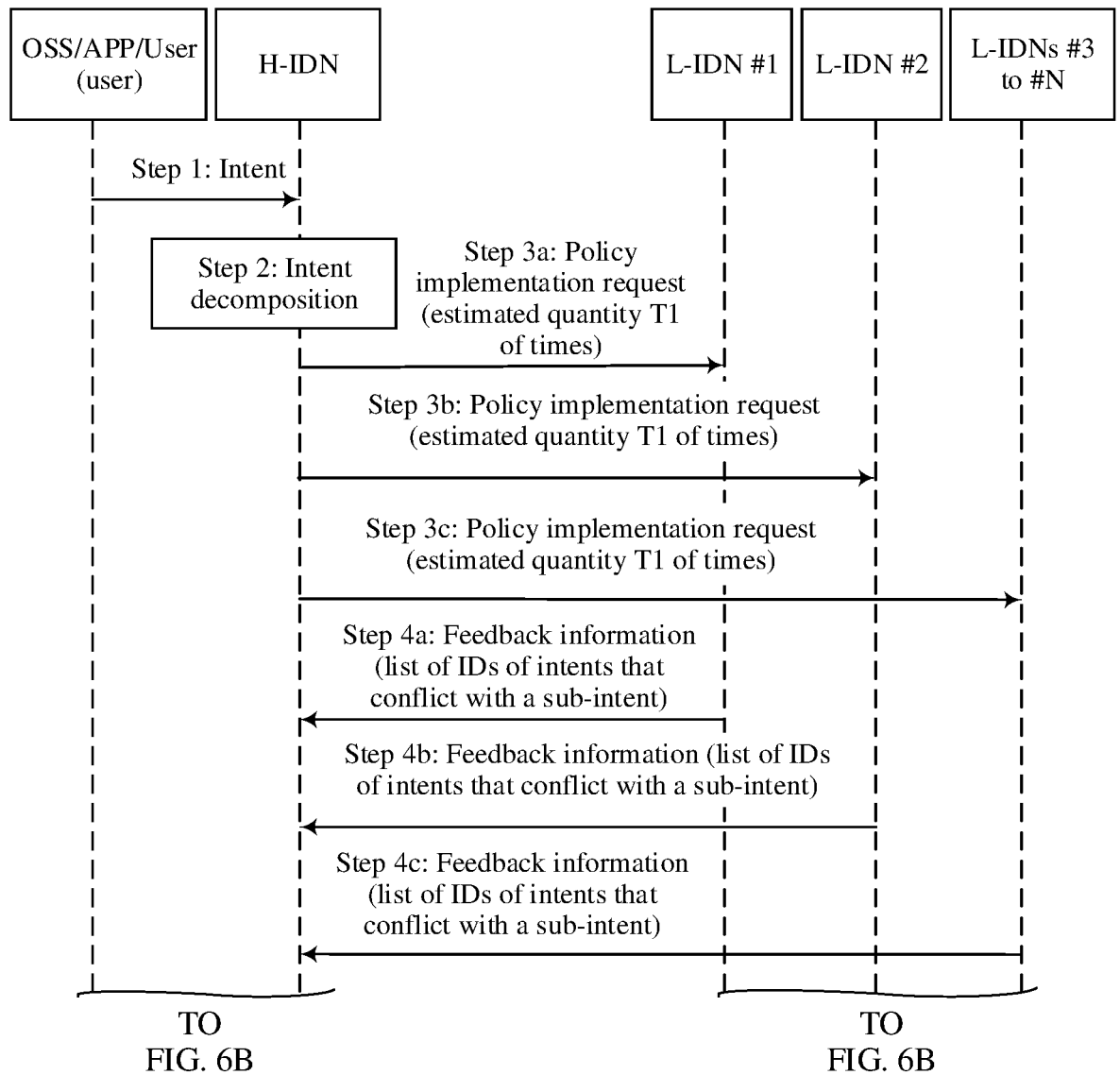
FIG. 6A and FIG. 6B are a first flowchart of intent negotiation performed by an H-IDN and L-IDNs according to this application.
Figure 6B:
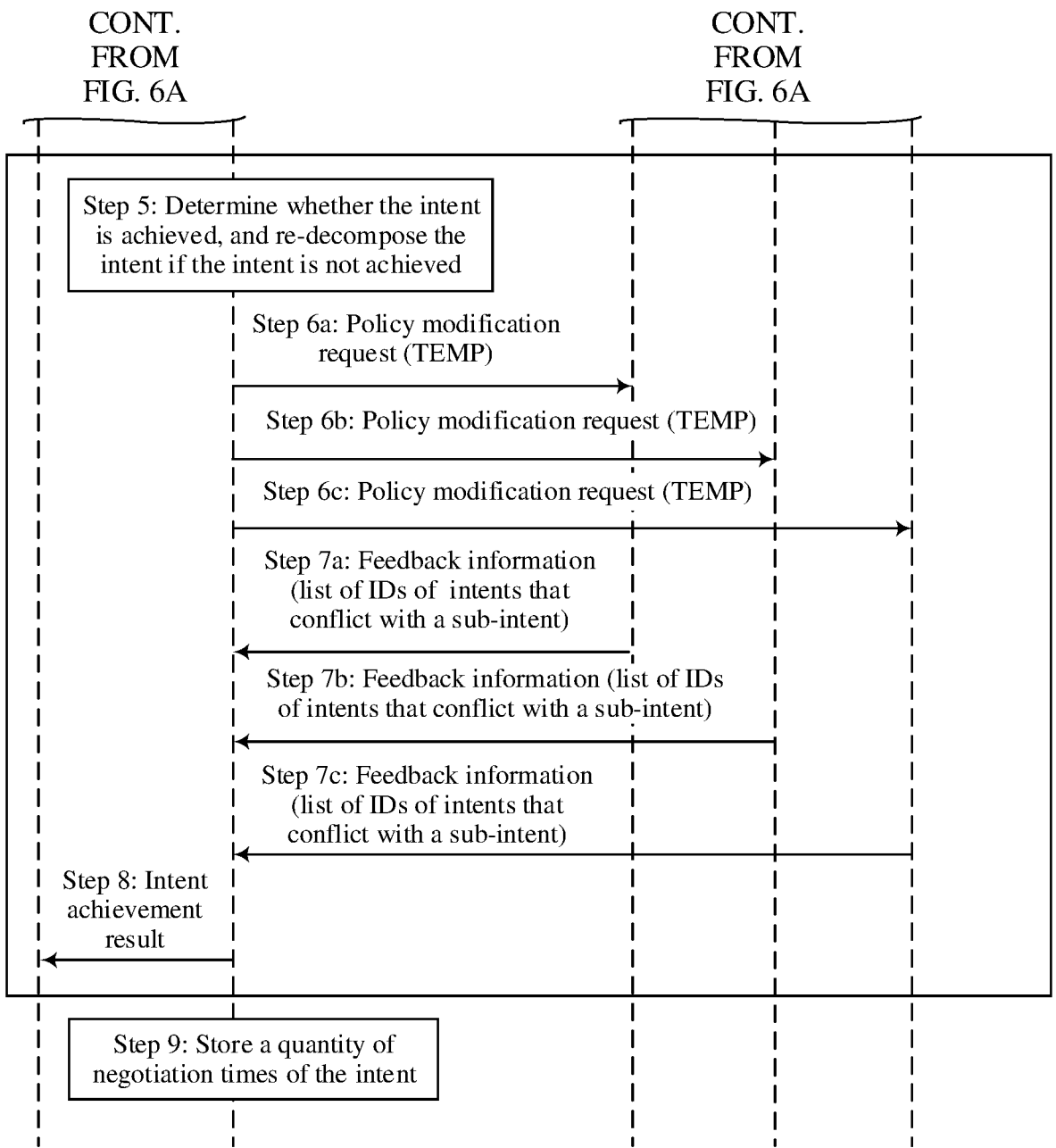

Embodiment 1: An H-IDN and an L-IDN perform an intent negotiation process, as shown in FIG. 6A and FIG. 6B.

Step 1: An OSS/an APP/a user delivers an intent to the H-IDN.

The operation support system (OSS) is a system for supporting integration and information resource sharing of telecommunications operators, and mainly includes parts such as network management, system management, charging, business, accounting, customer services, and the like.

The application (APP) refers to a third-party service APP on a network management system, for example, a service system of a vertical industry.

Step 2: The H-IDN decomposes a target value of the intent into target values of sub-intents of L-IDNs.

Step 3: The H-IDN sends a policy implementation request to the L-IDN, where the policy implementation request includes an intent expression of the sub-intent. In addition, the policy implementation request may further include indication information and an estimated quantity T1 of times. The estimated quantity T1 of times indicates a quantity of negotiation times of an intent (which is referred to as a reference intent for short below) that has a same action and a same object as the intent. For example, in FIG. 6A and FIG. 6B, step 3a, step 3b, and step 3c are performed.

Step 4: The L-IDN sends feedback information to the H-IDN, where the feedback information includes indication information indicating whether the sub-intent is achieved and conflict intent information. For example, the conflict intent information includes a list of IDs of intents that conflict with the sub-intent. In FIG. 6A and FIG. 6B, step 4a, step 4b, and step 4c are performed.

Step 5: The H-IDN determines, based on feedback information reported by each L-IDN, whether the intent is achieved. If the intent is not achieved, the H-IDN re-decomposes the intent, determines a target value of an updated sub-intent of each L-IDN, and performs step 6. If the intent is achieved, step 8 is performed.

Step 6: The H-IDN sends a policy modification request to the L-IDN, where the policy modification request includes an intent expression of a sub-intent obtained through re-decomposition and indication information. For example, a value of the indication information may be TEMP. For example, in FIG. 6A and FIG. 6B, step 6a, step 6b, and step 6c are performed.

In addition, the policy modification request may further include an estimated quantity T2 of times. For example, the H-IDN determines achievement states of a plurality of sub-intents obtained through an initial time of decomposition of the intent, and calculates an initial sub-intent achievement ratio corresponding to the intent. If the initial sub-intent achievement ratio corresponding to the intent is less than an initial sub-intent achievement ratio corresponding to the reference intent, the H-IDN sends the preset quantity T2 of times when sending the policy modification request to the L-IDN at a second time. The preset quantity T2 of times is greater than the preset quantity T1 of times.

Step 7: The L-IDN sends feedback information to the H-IDN, where the feedback information includes indication information indicating whether the sub-intent determined in step 6 is achieved and conflict intent information. For example, in FIG. 6A and FIG. 6B, step 7a, step 7b, and step 7c are performed.

Steps 5 to 7 are repeated until the H-IDN determines that the sub-intent of each L-IDN is achieved, or the intent is deleted, or intent negotiation times out.

Step 8: The H-IDN feeds back an intent achievement result to the OSS/APP/user, where the intent achievement result carries indication information indicating whether the intent is achieved and conflict intent information corresponding to each sub-intent.

Step 9: The H-IDN stores a quantity of negotiation times of the intent. For example, the H-IDN may update the estimated quantity T1 of times based on the stored quantity of negotiation times of the intent.

Figure 7A:
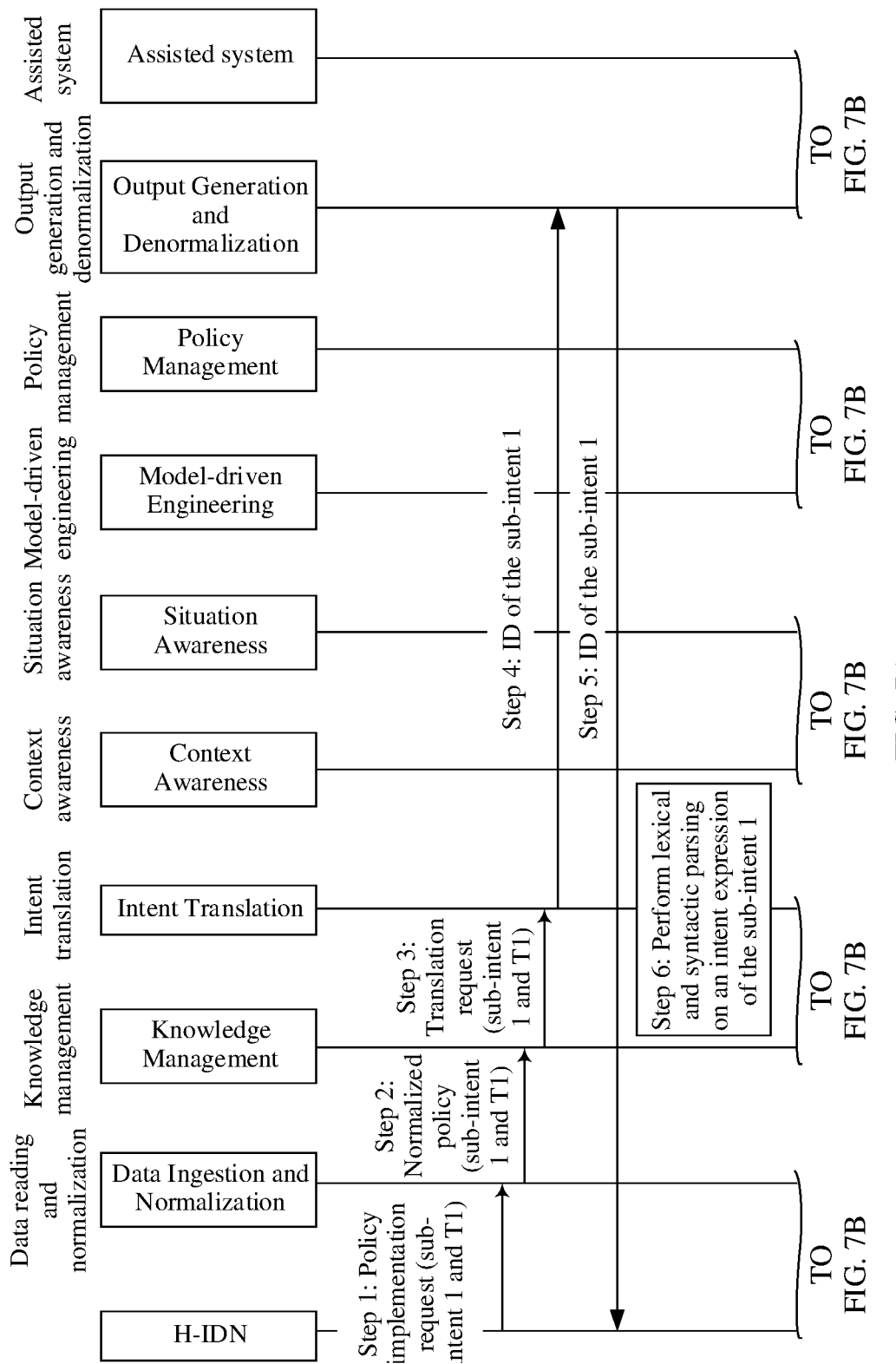
Figure 7C:
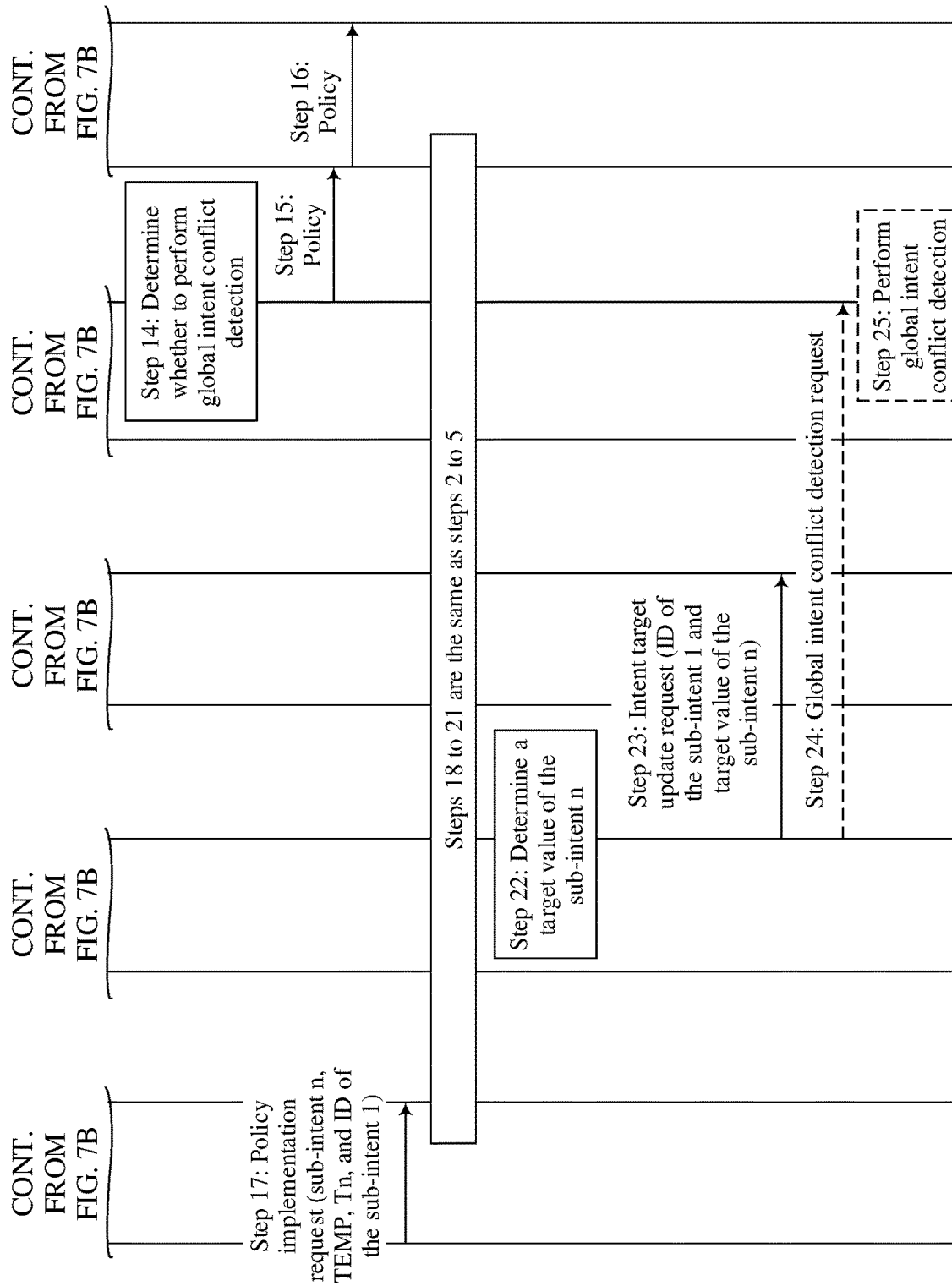

Embodiment 2 shows a first process in which an L-IDN executes an intent. In this embodiment, an Intent Translation is used as an independent functional module of an architecture, as shown in FIG. 7A to FIG. 7C.

Step 1: Data Ingestion & Normalization module receive a policy implementation request from an H-IDN, where the policy implementation request includes an initially delivered sub-intent (which is referred to as a sub-intent 1 for short below), an execution type indication COMMON, and an estimated quantity T1 of times.

Step 2: The Data Ingestion & Normalization module send a normalized policy to a Knowledge Management module, where the normalized policy includes the sub-intent 1, the execution type indication COMMON, and the estimated quantity T1 of times.

Step 3: The Knowledge Management module identifies that the normalized policy includes the sub-intent 1, and initiates a translation request to the Intent Translation, where the translation request carries the sub-intent 1, an execution type indication TEMP, and the estimated quantity T1 of times.

Step 4: The Intent Translation allocates an ID to the sub-intent 1, and sends the ID to Output Generation and Denormalization modules.

Step 5: The Output Generation and Denormalization modules send an acknowledgment message to the H-IDN, where the acknowledgment message carries the ID.

Step 6: The Intent Translation performs lexical and syntactic parsing on an intent expression of the sub-intent 1.

Step 7: The Intent Translation sends a keyword of the sub-intent 1 or a subject of the sub-intent 1 to the Knowledge Management.

Step 8: The Knowledge Management module sends an available execution policy set of the intent to the Intent Translation.

Step 9: The Intent Translation obtains a quantity N of policies in the available execution policy set, and sets a global conflict detection indication g_conflict. If N<T1, g_conflict is set to 1. Otherwise, g_conflict is set to 0.

Steps 10 to 13: Perform context addition and formalization on the policy, where a message needs to carry g_conflict.

In steps 10 to 13, a network state context and an intent achievement state context are separately added, and a policy detail is generated according to a model-driven method.

Step 14: A Policy Management determines, according to an indication of g_conflict, whether to perform global intent conflict detection. If a value of g_conflict is 1, global intent conflict detection is performed, to form a conflict information map. Otherwise, global intent conflict detection is not performed. After the Policy Management generates a policy after this process, if there is a conflict with another existing intent, the conflict needs to be resolved.

Step 15: The Policy Management sends the policy to the Output Generation and Denormalization modules.

Step 16: The Output Generation and Denormalization modules send the policy to an assisted system.

The foregoing step 1 to step 16 are an initial sub-intent delivery process.

Step 17: The Data Ingestion & Normalization module receive a policy modification request from the H-IDN. In addition to an updated sub-intent (which is a sub-intent delivered at an $n^{th}$ time, and is referred to as a sub-intent n for short below), the policy modification request further needs to carry the execution type indication TEMP, an estimated quantity Tn of times, and the ID of the sub-intent 1.

Steps 18 to 21 are the same as steps 2 to 5.

Step 22: The Intent Translation determines only a target value of the sub-intent n in an intent expression of the sub-intent n.

Step 23: The Intent Translation sends an intent target update request to a Situation Awareness module, where the intent target update request carries the ID of the sub-intent 1 and the target value of the sub-intent n.

It may be understood that if N≥Tn, the procedure ends. If N<Tn and the Policy Management has not performed global intent conflict detection, step 24 is performed.

Step 24: If N<Tn, the Intent Translation sends a global intent conflict detection request to the Policy Management, where a message carries the ID of the sub-intent 1.

Step 25: After receiving the global intent conflict detection request, the Policy Management performs global intent conflict detection, to form the conflict information map.

The foregoing step 17 to step 25 are a non-initial sub-intent delivery process.

Figure 8A:
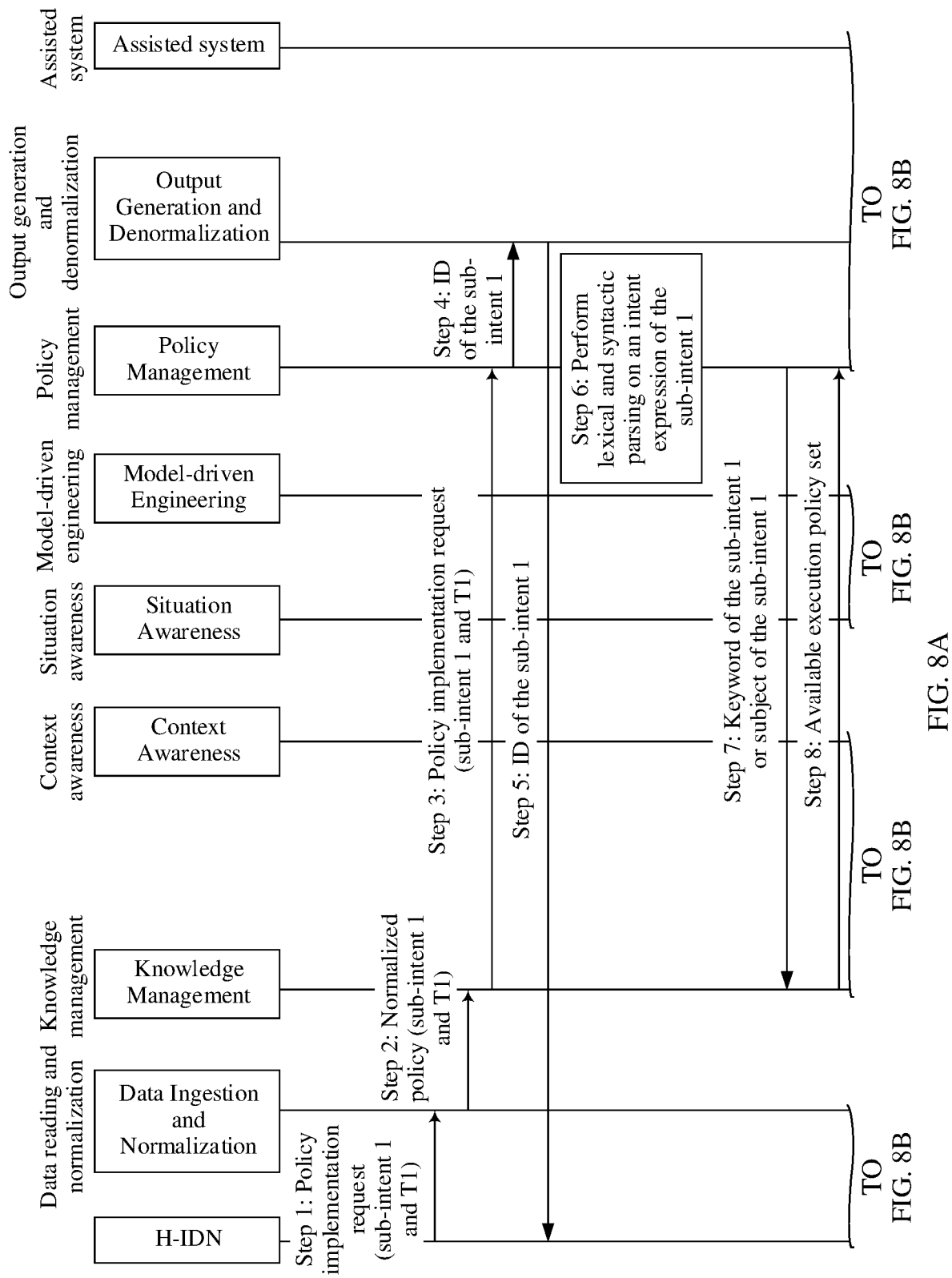
FIG. 8A and FIG. 8B are a first flowchart of executing an intent by an L-IDN when a Policy Management has an intent translation function according to this application.
Figure 8B:
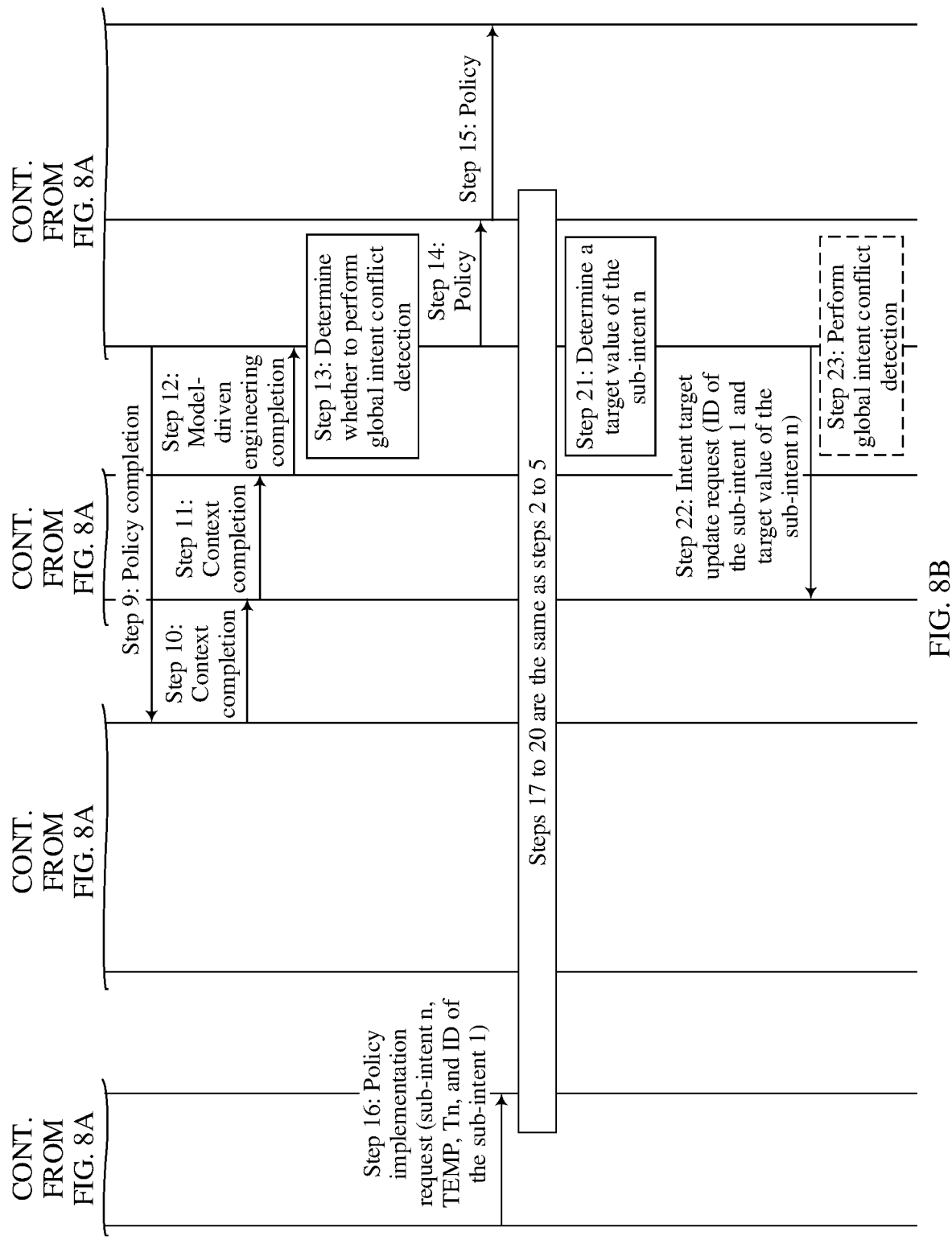

Embodiment 3 shows a second process in which an L-IDN executes an intent. In this embodiment, a Policy Management has an intent translation function, as shown in FIG. 8A and FIG. 8B.

Step 1: Data Ingestion & Normalization module receive a policy implementation request from an H-IDN, where the policy implementation request includes an initially delivered sub-intent (which is referred to as a sub-intent 1 for short below), an execution type indication TEMP, and an estimated quantity T1 of times.

Step 2: The Data Ingestion & Normalization module send a normalized policy to a Knowledge Management, where the normalized policy includes the sub-intent 1, the execution type indication TEMP, and the estimated quantity T1 of times.

Step 3: The Knowledge Management module identifies that the normalized policy includes the sub-intent 1, and initiates a policy implementation request to the Policy Management, where the policy implementation request carries the sub-intent 1, the execution type indication TEMP, and the estimated quantity T1 of times.

Step 4: The Policy Management allocates an ID to the sub-intent 1 and sends the ID to Output Generation and Denormalization modules.

Step 5: The Output Generation and Denormalization modules send an acknowledgment message to the H-IDN, where the acknowledgment message carries the ID.

Step 6: The Policy Management performs lexical and syntactic parsing on an intent expression of the sub-intent 1.

Step 7: The Policy Management sends a keyword of the sub-intent 1 or a subject of the sub-intent 1 to the Knowledge Management.

Step 8: The Knowledge Management module sends an available execution policy set of the intent to the Policy Management.

Step 9: The Policy Management obtains a quantity N of policies in the available execution policy set, and sets a global conflict detection indication g_conflict. If N<T1, g_conflict is set to 1. Otherwise, g_conflict is set to 0.

Steps 10 to 13: Perform context addition and formalization on the policy, where a message needs to carry g_conflict.

Step 14: The Policy Management determines, according to an indication of g_conflict, whether to perform global intent conflict detection. If a value of g_conflict is 1, global intent conflict detection is performed, to form a conflict information map. Otherwise, the global intent conflict detection is not performed. After the Policy Management generates a policy after this process, if there is a conflict with another existing intent, the conflict needs to be resolved.

Step 15: The Policy Management sends the policy to the Output Generation and Denormalization modules.

Step 16: The Output Generation and Denormalization modules send the policy to an assisted system.

The foregoing step 1 to step 16 are an initial sub-intent delivery process.

Step 17: The Data Ingestion & Normalization module receive a policy modification request from the H-IDN. In addition to an updated sub-intent (which is a sub-intent delivered at an $n^{th}$ time, and is referred to as a sub-intent n for short below), the policy modification request further needs to carry the execution type indication TEMP, an estimated quantity Tn of times, and the ID of the sub-intent 1.

Steps 18 to 21 are the same as steps 2 to 5.

Step 22: The Policy Management determines only a target value of the sub-intent n in an intent expression of the sub-intent n.

Step 23: The Policy Management sends an intent target update request to a Situation Awareness module, where the intent target update request carries the ID of the sub-intent 1 and the target value of the sub-intent n.

It may be understood that if N≥Tn, the procedure ends. If N<Tn and the Policy Management has not performed global intent conflict detection, step 24 is performed.

Step 24: If N<Tn, the Policy Management performs global intent conflict detection, to form the conflict information map.

The foregoing step 17 to step 24 are a non-initial sub-intent delivery process.

Figure 9:
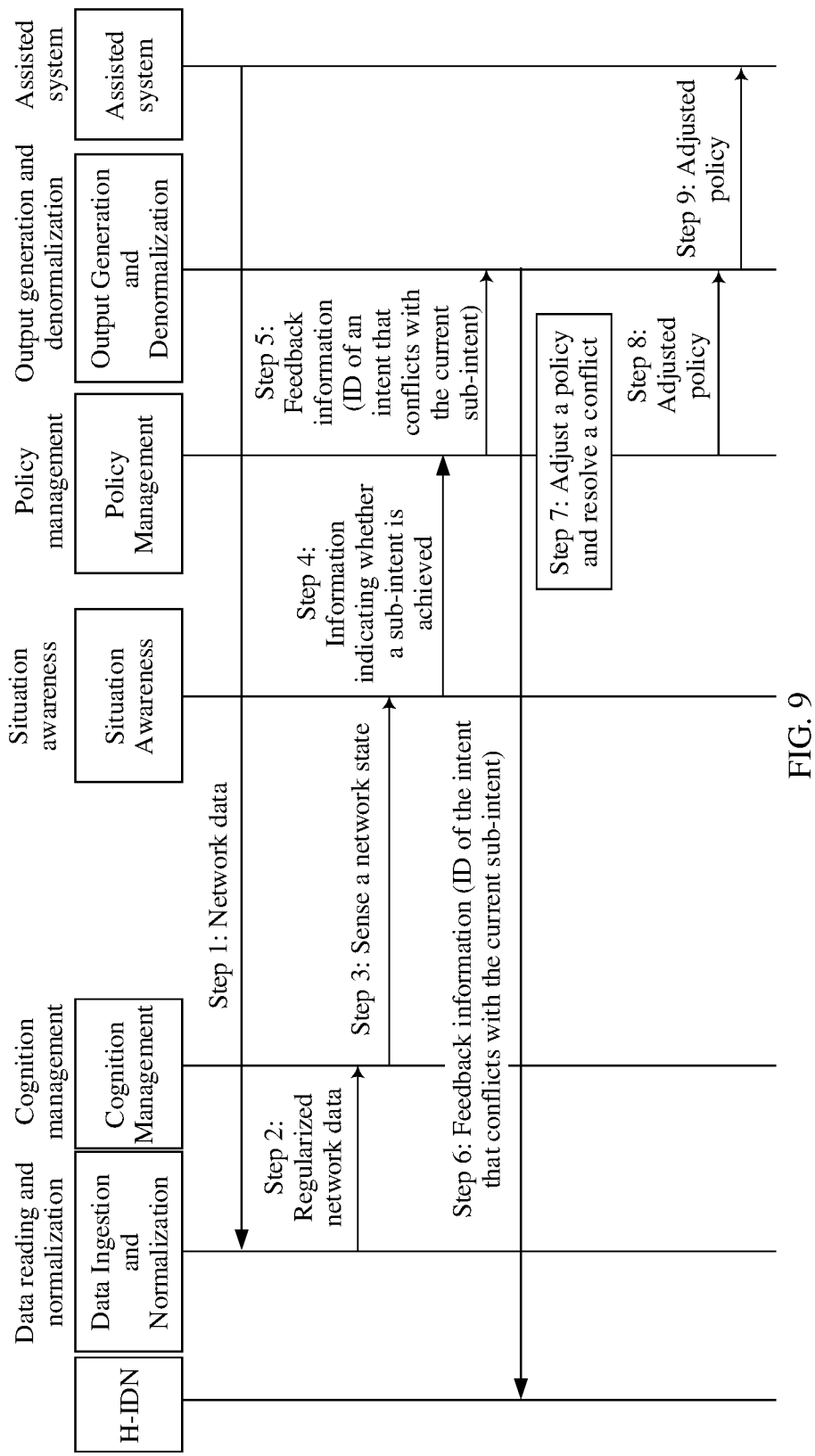
FIG. 9 is a specific flowchart of an intent maintenance process according to this application.

Embodiment 4 shows an intent maintenance process, as shown in FIG. 9.

Step 1: An assisted system reports network data to Data Ingestion & Normalization module.

Step 2: The Data Ingestion & Normalization module send regularized network data to a Cognition Management module.

Step 3: The Cognition Management module senses a network state based on the network data and sends the network state to a Situation Awareness module.

Step 4: The Situation Awareness module analyzes whether a target value of a sub-intent is achieved, and sends information indicating whether the sub-intent is achieved to a Policy Management.

Step 5: The Policy Management sends feedback information to Output Generation and Denormalization modules.

The feedback information includes the information indicating whether the sub-intent is achieved and a conflict intent list. The conflict intent list includes an ID of an intent that conflicts with the current sub-intent. When the Policy Management has performed global intent conflict detection, the ID of the intent that conflicts with the current sub-intent may be obtained by using a conflict sub-intent set. When the Policy Management has not performed global intent conflict detection, the ID of the intent that conflicts with the current sub-intent may be obtained through intent conflict detection for the current sub-intent.

Step 6: The Output Generation and Denormalization modules send feedback information to an H-IDN.

Step 7: If the sub-intent is not achieved, the Policy Management adjusts the policy based on the current network state, obtains, from a conflict information map, an ID of a conflict intent after adjusting the policy, and invokes an existing internal method to resolve a conflict.

Therefore, a conflict intent list included in feedback information is obtained from step 7 of a last iteration.

Step 8: The Policy Management sends an adjusted policy to the Output Generation and Denormalization modules.

Step 9: The Output Generation and Denormalization modules send the adjusted policy to the assisted system.

If the sub-intent is achieved, steps 1 to 6 are repeatedly performed. If the sub-intent is not achieved, steps 1 to 9 are performed.

Figure 10:
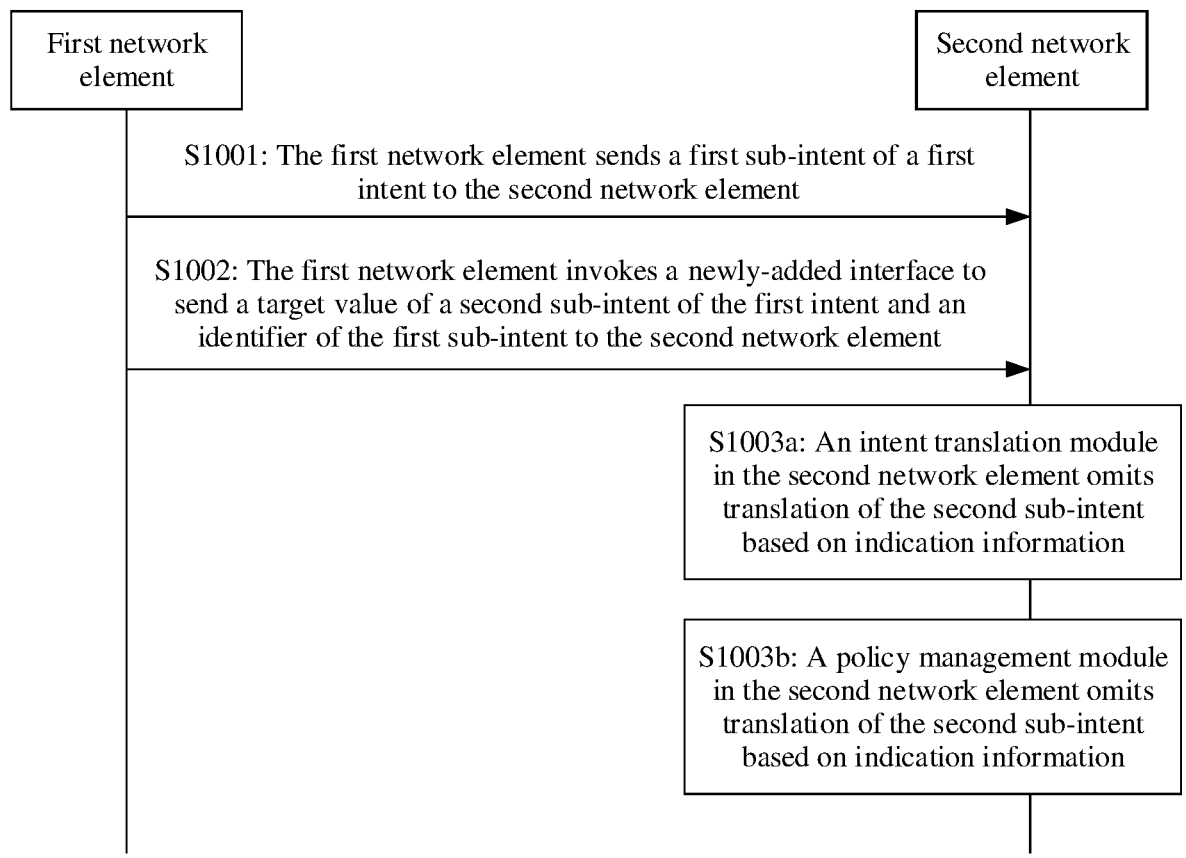
FIG. 10 is a second overview flowchart of an intent negotiation method according to this application.

To resolve a problem that an existing intent negotiation solution causes a large waste of resources on an L-IDN side because only achievement of an intent received by an H-IDN is considered, an embodiment of this application provides an intent negotiation method. As shown in FIG. 10, it may be understood that in this embodiment, a level of an intent management function in a first network element is higher than a level of an intent management function in a second network element. There are one or more second network elements. For example, the first network element may be a network element in which the H-IND is located, and the second network element may be a network element in which an L-IDN is located. The method includes the following steps.

S1001: The first network element sends a first sub-intent of a first intent to the second network element.

For specific content, refer to step 501. Repeated parts are not described again.

S1002: The first network element invokes a newly added interface to send a target value of a second sub-intent of the first intent and an identifier of the first sub-intent to the second network element.

The newly added interface is used by the first network element to send, to the second network element, a sub-intent that has a same action and a same object as the first sub-intent. Alternatively, the sub-intent is described as a sub-intent that has a target value different from that of the first sub-intent.

It may be understood that the second sub-intent arrives at the second network element after the first sub-intent, and the first sub-intent and the second sub-intent are sub-intents that are for the first intent and that are delivered by the first network element at two consecutive times.

For example, after the second network element receives the first sub-intent, the second network element executes the first sub-intent. When the second network element determines that the first sub-intent is not achieved, the second network element sends feedback information to the first network element. The feedback information indicates that the first sub-intent is not achieved.

It should be noted that the second network element may continuously determine, within a period of time by adjusting a policy, whether the first sub-intent is achieved, and send feedback information to the second network element after each time of determining. Because a network state of an assisted system is not constant, and may change at any time, an achievement state of the first sub-intent indicated by the feedback information reported by the second network element may change. For example, the L-IDN may indicate, in feedback information reported at first several times, that the sub-intent is not achieved, but indicate, in feedback information reported subsequently, that the sub-intent is achieved. For another example, the L-IDN may indicate, in feedback information reported at first several times, that the sub-intent is achieved, but indicate, in feedback information reported subsequently, that the sub-intent is not achieved. Generally, the H-IDN determines, based on feedback information obtained at a last time or feedback information obtained at last several consecutive times that indicates a same completion state of the sub-intent, whether the sub-intent is achieved.

Correspondingly, the first network element receives a plurality of pieces of feedback information from the second network element, and the first network element determines, based on the plurality of pieces of feedback information, that the first sub-intent is not achieved. In this case, the first network element decomposes the first intent to obtain a plurality of sub-intents. The plurality of sub-intents include the second sub-intent.

It may be understood that, when the first sub-intent is a sub-intent obtained by the first network element through an initial time of decomposition of the first intent, the second sub-intent may be a sub-intent obtained by the first network element through a second time of decomposition of the first intent. Alternatively, when the first sub-intent is a sub-intent obtained by the first network element through a $k^{th}$ time of decomposition of the first intent, the second sub-intent may be a sub-intent obtained by the first network element through a $(k+1)^{th}$ time of decomposition of the first intent.

In addition, the first network element may further send an estimated quantity of times to the second network element. For details, refer to related content in the embodiment shown in FIG. 5.

In some embodiments, in correspondence to the foregoing S1001 and S1002, on a second network element side, when an intent translation module is used as an independent functional module of an architecture, the intent translation module receives the first sub-intent of the first intent from the first network element, and the intent translation module receives the target value of the second sub-intent of the first intent and the identifier of the first sub-intent through the newly added interface.

S1003a: The intent translation module omits translation of the second sub-intent based on indication information.

Specifically, the intent translation module sends an intent target modification message to a third network element in the second network element, where the intent target modification message includes an identifier of a third sub-intent and the target value of the second sub-intent. For example, the third network element may be a situation awareness module in the second network element, and the third sub-intent is a $1^{st}$ sub-intent that is for the first intent and that is received by the intent translation module from the first network element. For example, when the first sub-intent is the $1^{st}$ sub-intent for the first intent, the third sub-intent is the first sub-intent.

In an intent negotiation process, the intent translation module may not repeatedly perform complete lexical and syntactic analysis and obtaining of an available execution policy set. Therefore, system resources can be saved.

In addition, after the intent translation module receives the estimated quantity of times from the first network element, for behavior of the intent translation module, refer to related content in step 503a. Repeated parts are not described again.

In some embodiments, in correspondence to the foregoing S1001 and S1002, on the second network element side, when a policy management module has an intent translation function, the policy management module receives the first sub-intent of the first intent from the first network element, and the policy management module receives the target value of the second sub-intent of the first intent and the identifier of the first sub-intent through the newly added interface.

S1003b: The policy management module omits translation of the second sub-intent based on indication information.

Specifically, the policy management module sends an intent target modification message to a third network element in the second network element, where the intent target modification message includes an identifier of a third sub-intent and the target value of the second sub-intent. For example, the third network element may be a situation awareness module in the second network element, and the third sub-intent is a $1^{st}$ sub-intent that is for the first intent and that is received by the policy management module from the first network element. For example, when the first sub-intent is the $1^{st}$ sub-intent for the first intent, the third sub-intent is the first sub-intent.

Therefore, in an intent negotiation process, the policy management module may not repeatedly perform complete lexical and syntactic analysis and obtaining of an available execution policy set. Therefore, system resources can be saved.

In addition, after the policy management module receives the estimated quantity of times from the first network element, for behavior of the policy management module, refer to related content in step 503b. Repeated parts are not described again.

The following describes the embodiment shown in FIG. 10 with reference to the accompanying drawings. It may be understood that in the following descriptions, a first sub-intent may correspond to the foregoing first sub-intent, a second sub-intent may correspond to the foregoing second sub-intent, and a third sub-intent may correspond to the foregoing third sub-intent.

Figure 11C:
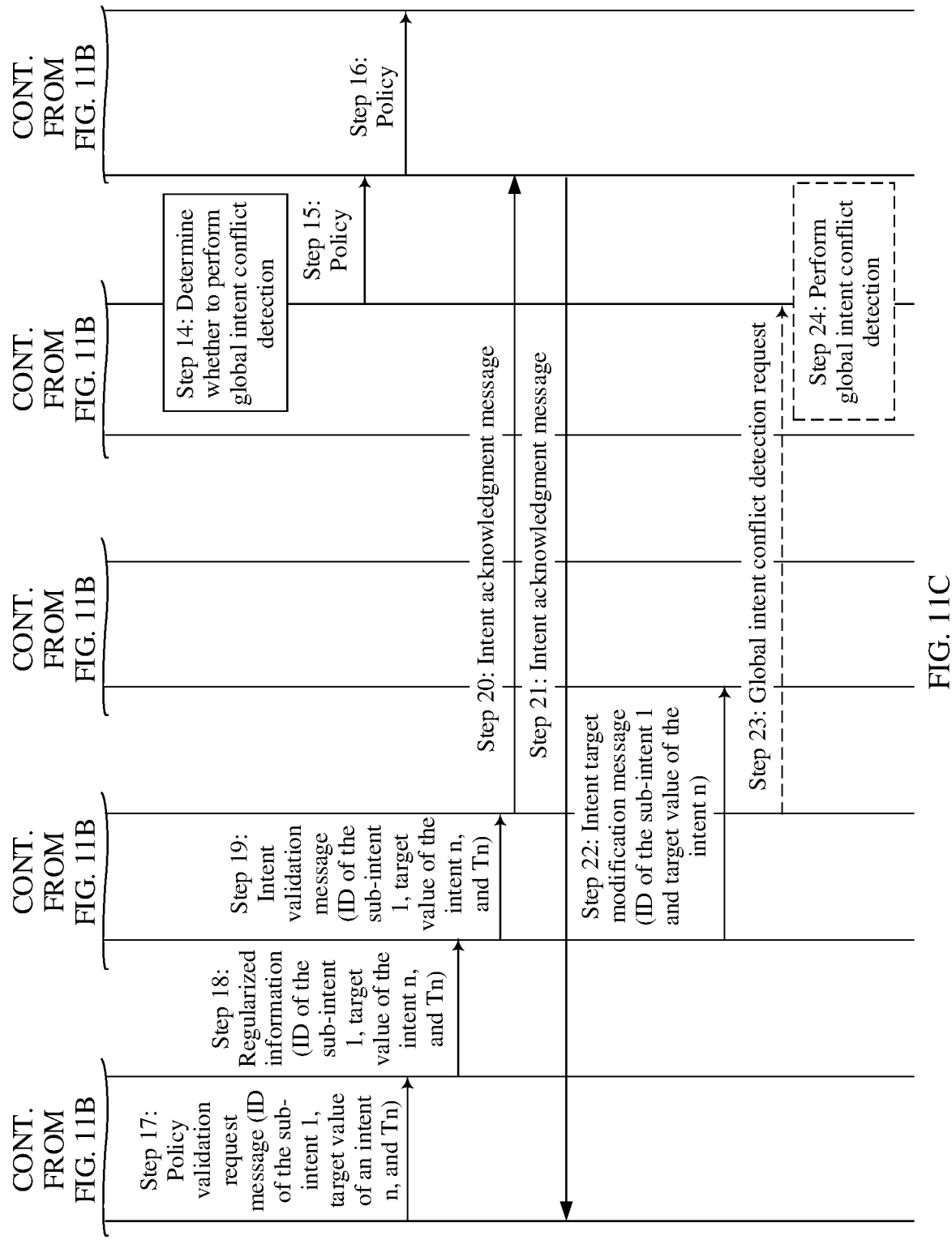

Embodiment 5: As shown in FIG. 11A to FIG. 11C, in this embodiment, an Intent Translation is used as an independent functional module of an architecture.

Step 1: Data Ingestion & Normalization module receive a policy implementation request from an H-IDN, where the policy implementation request includes an initially delivered sub-intent (which is referred to as a sub-intent 1 for short below) and an estimated quantity T1 of times.

Step 2: The Data Ingestion & Normalization module send a normalized policy to a Knowledge Management, where the normalized policy includes the sub-intent 1 and the estimated quantity T1 of times.

Step 3: The Knowledge Management module identifies that the normalized policy includes the sub-intent 1, and initiates a translation request to the Intent Translation, where the translation request carries the sub-intent 1 and the estimated quantity T1 of times.

Step 4: The Intent Translation allocates an ID to the sub-intent 1, and sends the ID to Output Generation and Denormalization modules.

Step 5: The Output Generation and Denormalization modules send an acknowledgment message to the H-IDN, where the acknowledgment message carries the ID.

Step 6: The Intent Translation performs lexical and syntactic parsing on an intent expression of the sub-intent 1.

Step 7: The Intent Translation sends a keyword of the sub-intent 1 or a subject of the sub-intent 1 to the Knowledge Management.

Step 8: The Knowledge Management module sends an available execution policy set of the intent to the Intent Translation.

Step 9: The Intent Translation obtains a quantity N of policies in the available execution policy set, and sets a global conflict detection indication g_conflict. If N<T1, g_conflict is set to 1. Otherwise, g_conflict is set to 0.

Steps 10 to 13: Perform context addition and formalization on the policy, where a message needs to carry g_conflict.

Step 14: A Policy Management determines, according to an indication of g_conflict, whether to perform global intent conflict detection. If a value of g_conflict is 1, global intent conflict detection is performed, to form a conflict information map. Otherwise, the global intent conflict detection is not performed. After the Policy Management generates a policy after this process, if there is a conflict with another existing intent, the conflict needs to be resolved.

Step 15: The Policy Management sends the policy to the Output Generation and Denormalization modules.

Step 16: The Output Generation and Denormalization modules send the policy to an assisted system.

The foregoing step 1 to step 16 are an initial sub-intent delivery process.

Step 17: The H-IDN invokes a newly added interface to send a policy validation (validatePolicy) request, where the policy validation request message carries the ID of the sub-intent 1, a target value of an intent n, and an estimated quantity Tn of times.

Step 18: The Data Ingestion & Normalization module send regularized information to the Knowledge Management.

Step 19: The Knowledge Management module sends an intent validation message to the Intent Translation, where the intent validation message carries the ID of the sub-intent 1, the target value of the intent n, and the estimated quantity Tn of times.

Step 20: The Intent Translation sends an intent acknowledgment message to the Output Generation and Denormalization modules.

Step 21: The Output Generation and Denormalization modules send an intent acknowledgment message to the H-IDN.

Step 22: The Intent Translation directly sends an intent target modification message to a Situation Awareness module, where the intent target modification message carries the ID of the sub-intent 1 and the target value of the intent n.

It may be understood that if N≥Tn, the procedure ends. If N<Tn and the Policy Management has not performed global intent conflict detection, step 23 is performed.

Step 23: If N<Tn, the Intent Translation sends a global intent conflict detection request to the Policy Management, where a message carries the ID of the sub-intent 1.

Step 24: After receiving the global intent conflict detection request, the Policy Management performs global intent conflict detection, to form the conflict information map. The foregoing step 17 to step 24 are a non-initial sub-intent delivery process.

Figure 12A:
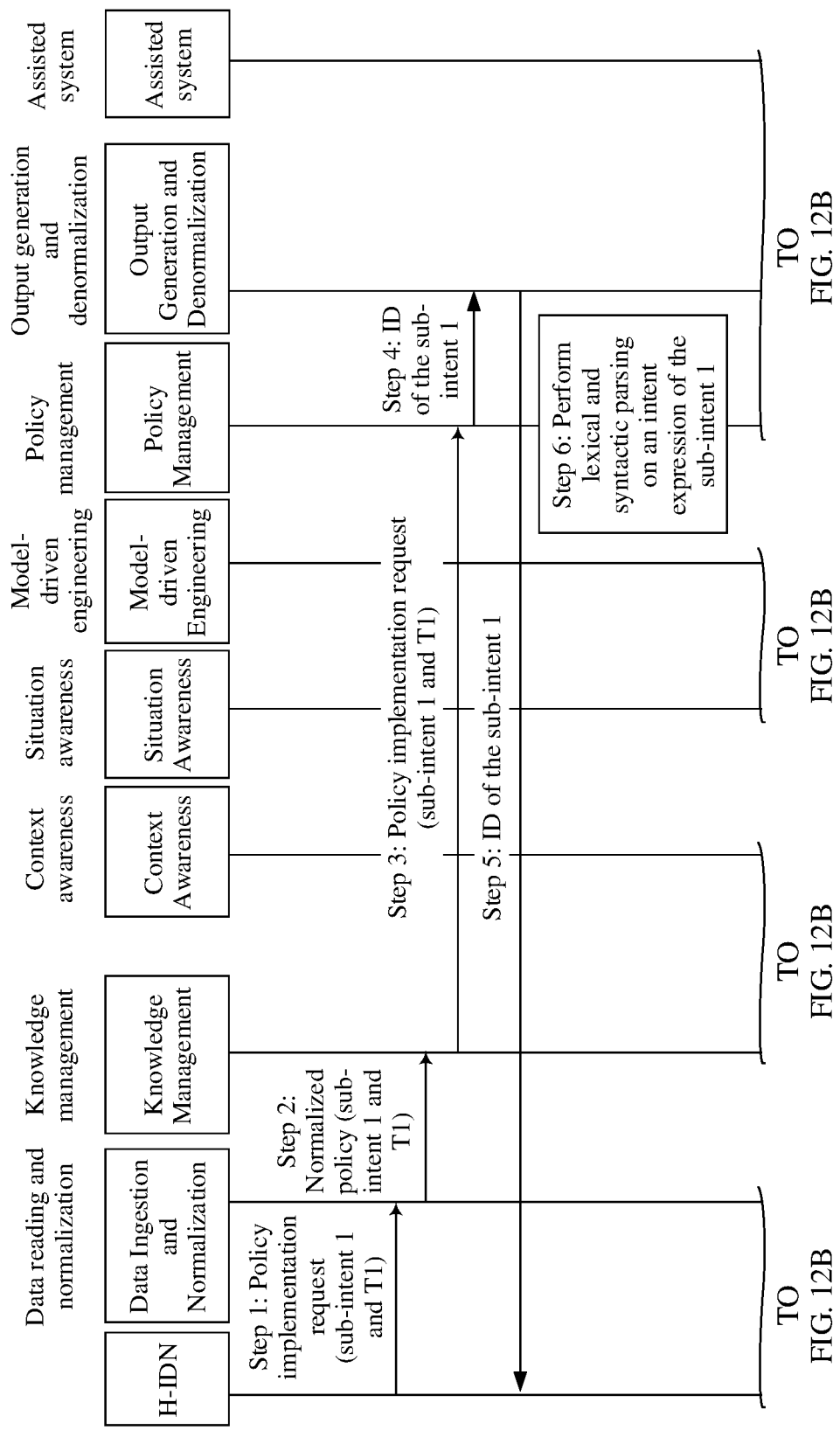
Figure 12C:
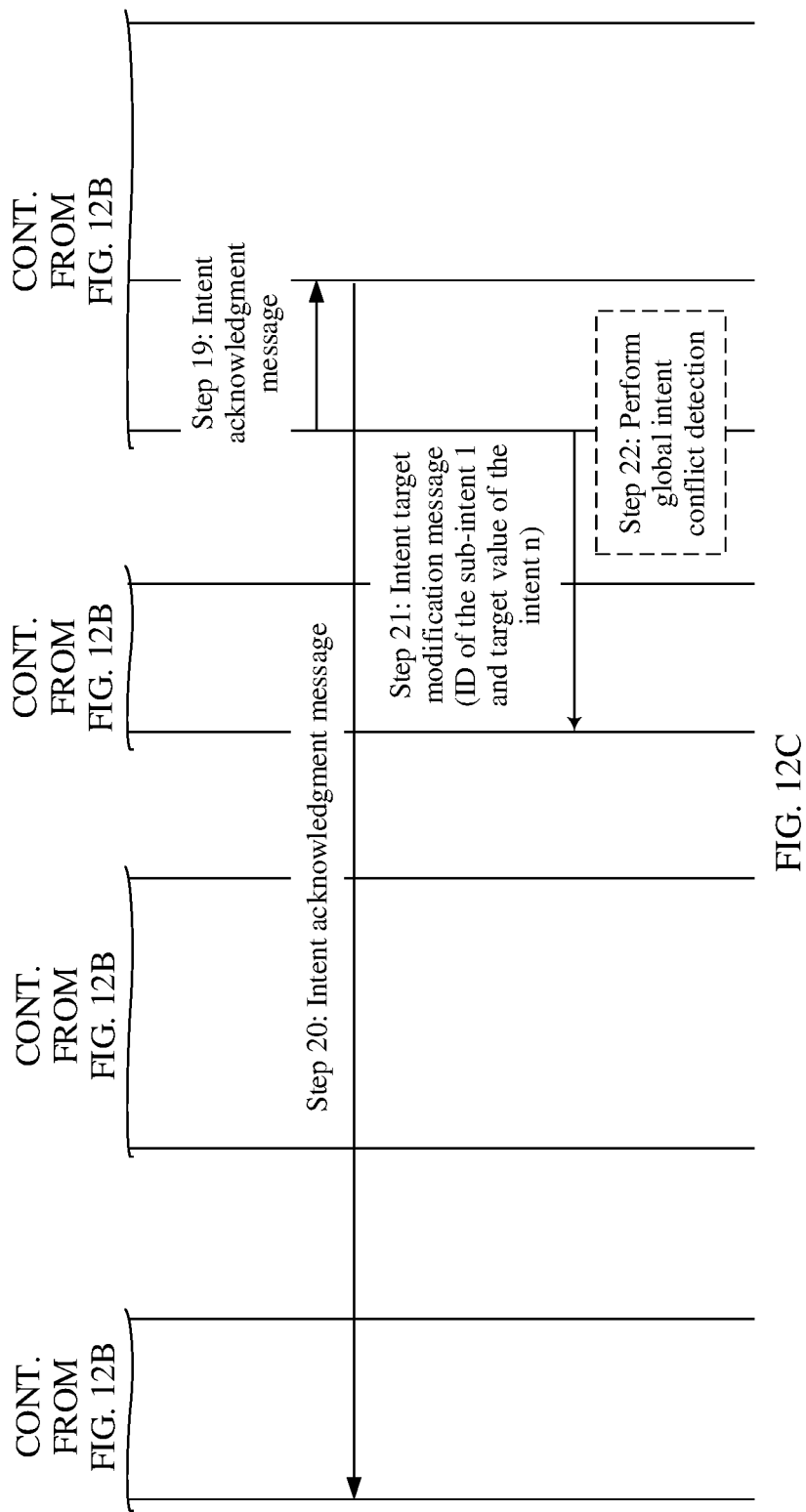

Embodiment 6: As shown in FIG. 12A to FIG. 12C, in this embodiment, a Policy Management has an intent translation function.

Step 1: Data Ingestion & Normalization module receive a policy implementation request from an H-IDN, where the policy implementation request includes an initially delivered sub-intent (which is referred to as a sub-intent 1 for short below) and an estimated quantity T1 of times.

Step 2: The Data Ingestion & Normalization module send a normalized policy to a Knowledge Management, where the normalized policy includes the sub-intent 1, an execution type indication TEMP, and the estimated quantity T1 of times.

Step 3: The Knowledge Management module identifies that the normalized policy includes the sub-intent 1, and initiates a policy implementation request to the Policy Management, where the policy implementation request carries the sub-intent 1, the execution type indication TEMP, and the estimated quantity T1 of times.

Step 4: The Policy Management allocates an ID to the sub-intent 1 and sends the ID to Output Generation and Denormalization modules.

Step 5: The Output Generation and Denormalization modules send an acknowledgment message to the H-IDN, where the acknowledgment message carries the ID.

Step 6: The Policy Management performs lexical and syntactic parsing on an intent expression of the sub-intent 1.

Step 7: The Policy Management sends a keyword of the sub-intent 1 or a subject of the sub-intent 1 to the Knowledge Management.

Step 8: The Knowledge Management module sends an available execution policy set of the intent to the Policy Management.

Step 9: The Policy Management sends a policy completion message to a Context awareness module.

Steps 10 to 12: Perform context addition and formalization on the policy.

Step 13: The Policy Management obtains a quantity N of policies in the available execution policy set, and sets a global conflict detection indication g_conflict. If N<T1, g_conflict is set to 1. Otherwise, g_conflict is set to 0. The Policy Management determines, according to an indication of g_conflict, whether to perform global intent conflict detection. If a value of g_conflict is 1, global intent conflict detection is performed, to form a conflict information map. Otherwise, the global intent conflict detection is not performed. After the Policy Management generates a policy after this process, if there is a conflict with another existing intent, the conflict needs to be resolved.

Step 14: The Policy Management sends the policy to the Output Generation and Denormalization modules.

Step 15: The Output Generation and Denormalization modules send the policy to an assisted system.

The foregoing step 1 to step 15 are an initial sub-intent delivery process.

Step 16: The H-IDN invokes a newly added interface to send a policy approval request (validatePolicy), where the policy approval request message carries the ID of the sub-intent 1, a target value of an intent n, and an estimated quantity Tn of times.

Step 17: The Data Ingestion & Normalization module send regularized information to the Knowledge Management.

Step 18: The Knowledge Management module sends an intent validation message to the Policy Management, where the intent validation message carries the ID of the sub-intent 1, the target value of the intent n, and the estimated quantity Tn of times.

Step 19: The Policy Management sends an intent acknowledgment message to the Output Generation and Denormalization modules.

Step 20: The Output Generation and Denormalization modules send an intent acknowledgment message to the H-IDN.

Step 21: The Policy Management directly sends an intent target modification message to a Situation Awareness module, where the intent target modification message carries the ID of the sub-intent 1 and the target value of the intent n.

It may be understood that if N≥Tn, the procedure ends. If N<Tn and the Policy Management has not performed global intent conflict detection, step 22 is performed.

Step 22: If N<Tn, the Policy Management performs global intent conflict detection, to form the conflict information map.

The foregoing step 16 to step 22 are a non-initial sub-intent delivery process.

It may be understood that, for an intent maintenance process of the embodiment shown in FIG. 10, refer to Embodiment 4. Repeated pails are not described again.

Figure 13:
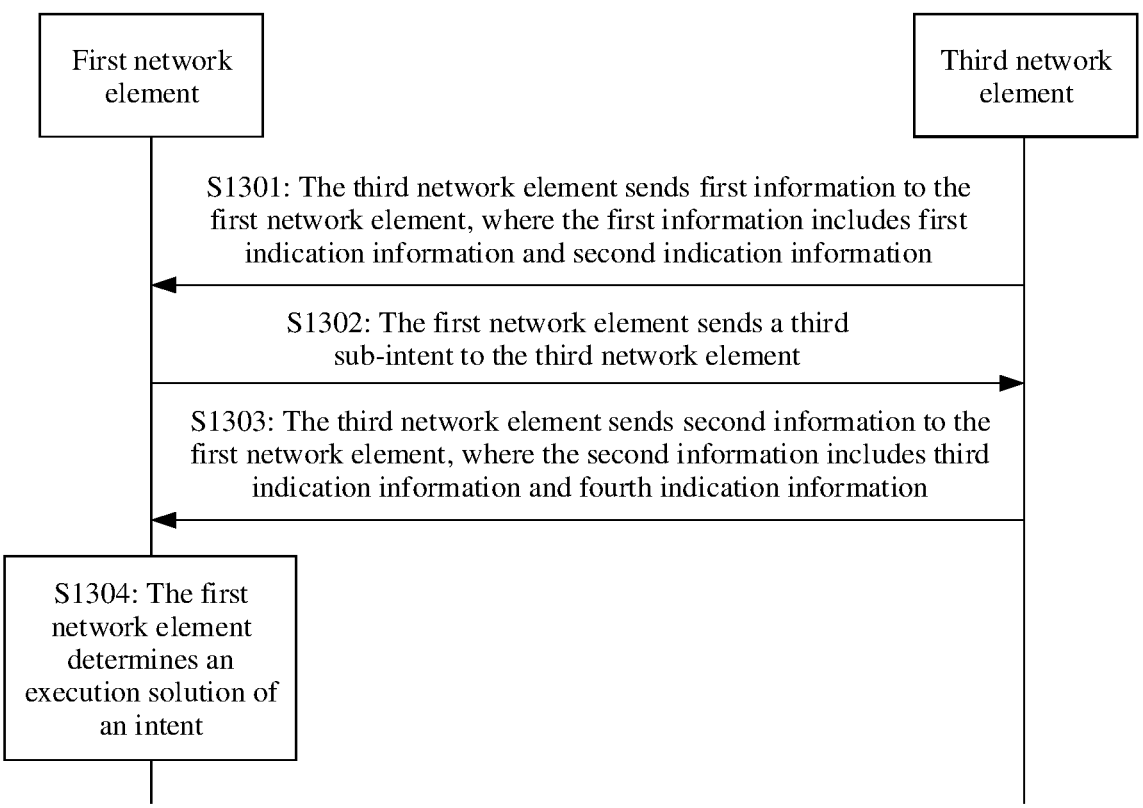
FIG. 13 is a third overview flowchart of an intent negotiation method according to this application.

In addition, an embodiment of this application further provides an intent decomposition optimization method. As shown in FIG. 13, the method includes the following steps.

S1301: A third network element sends first information to a first network element, where the first information includes first indication information and second indication information, the first indication information is used to indicate that a first sub-intent is achieved, the second indication information is used to indicate a second sub-intent that conflicts with the first sub-intent, and the first sub-intent is all sub-intents that are used to achieve an intent.

There are one or more third network elements.

S1302: The first network element sends a third sub-intent to the third network element, where the third sub-intent is different from the first sub-intent, and the third sub-intent is all sub-intents that are used to achieve the intent.

S1303: The third network element sends second information to the first network element, where the second information includes third indication information and fourth indication information, the third indication information is used to indicate that the third sub-intent is achieved, and the fourth indication information is used to indicate a fourth sub-intent that conflicts with the third sub-intent.

S1304: The first network element determines an execution solution of the intent. If a total quantity of second sub-intents is less than a total quantity of fourth sub-intents, the first network element determines the first sub-intent as the execution solution of the intent. In this case, the first network element needs to send the third sub-intent to the third network element. If the total quantity of second sub-intents is greater than or equal to the total quantity of fourth sub-intents, the first network element determines the third sub-intent as the execution solution of the intent.

Figure 14A:
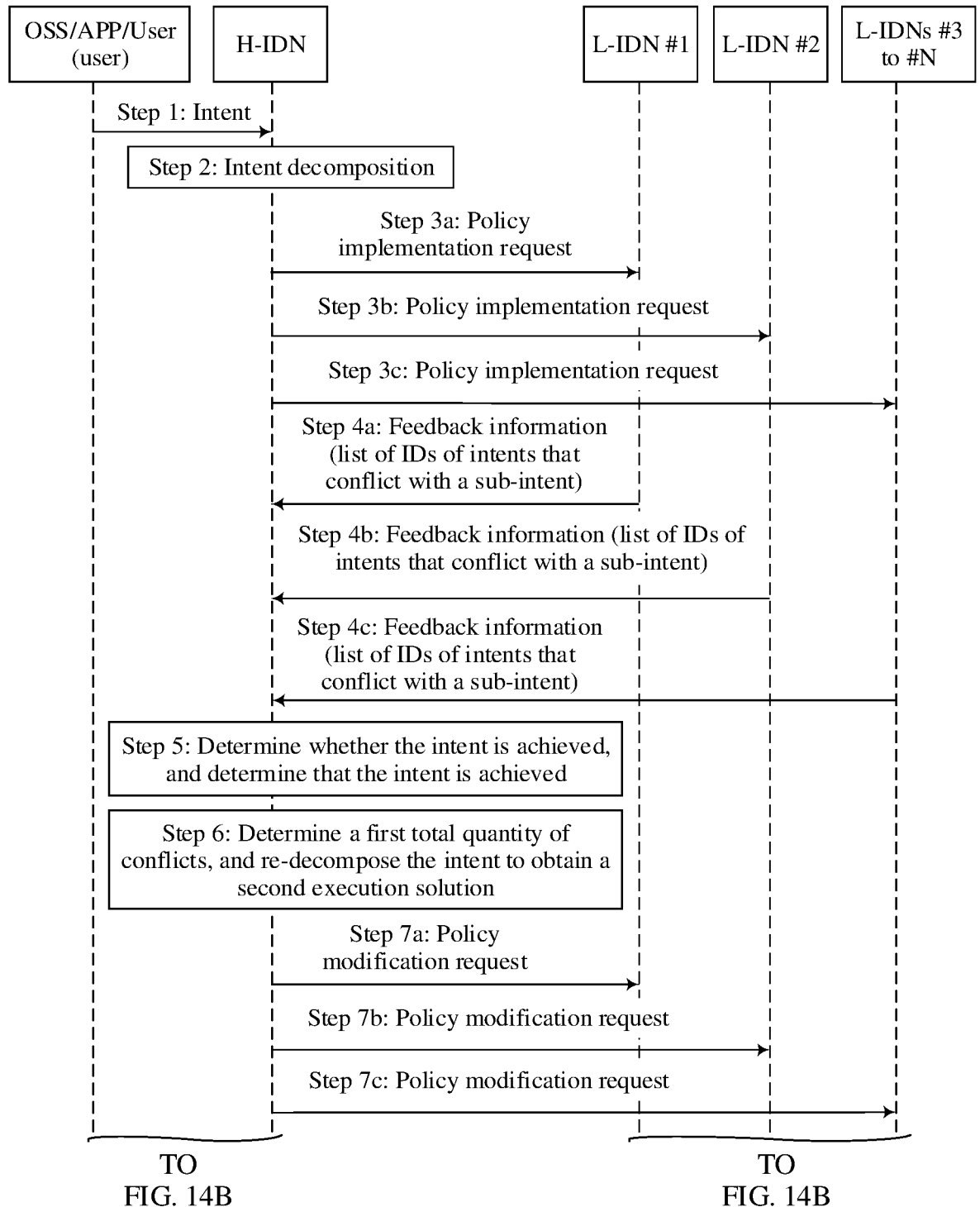
FIG. 14A and FIG. 14B are a second flowchart of intent negotiation performed by an H-IDN and L-IDNs according to this application.
Figure 14B:
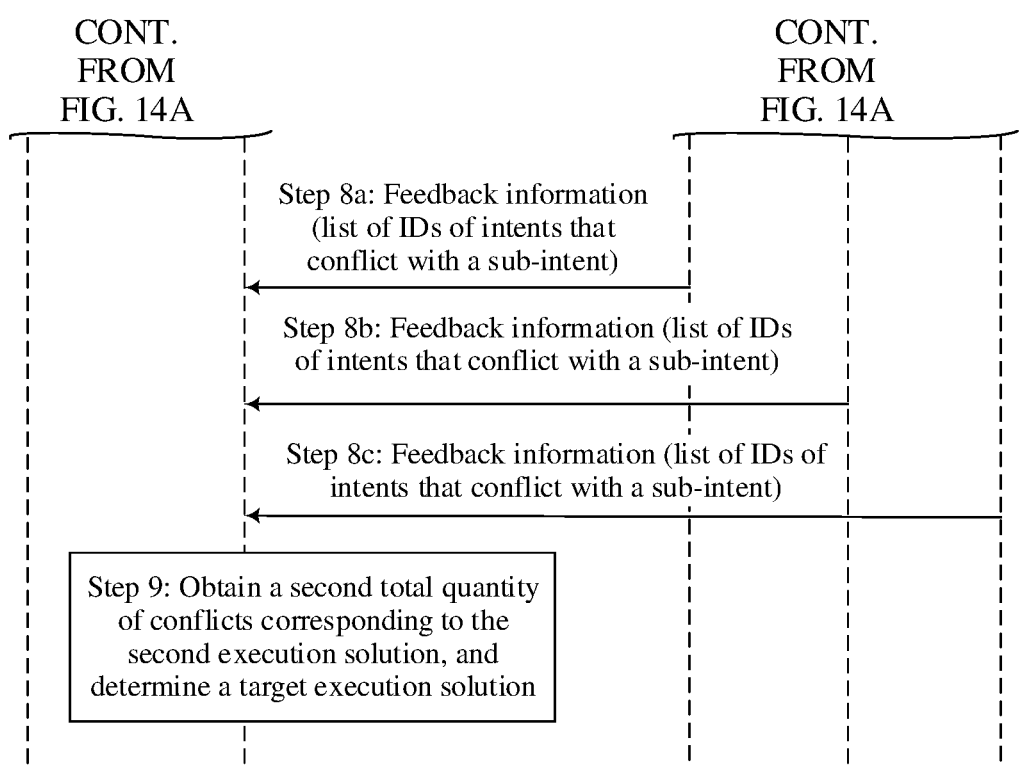

The following describes the embodiment shown in FIG. 10 with reference to the accompanying drawings, as shown in FIG. 14A and FIG. 14B.

Step 1: An OSS/an APP/a user delivers an intent to an H-IDN.

Step 2: The H-IDN decomposes a target value of the intent into target values of sub-intents of L-IDNs.

Step 3: The H-IDN sends a policy implementation request to the L-IDN, where the policy implementation request includes the sub-intent. For example, in FIG. 14A and FIG. 14B, step 3a, step 3b, and step 3c are performed.

Step 4: The L-IDN sends feedback information to the H-IDN, where the feedback information includes indication information indicating whether the sub-intent is achieved and conflict intent information. For example, the conflict intent information includes a list of IDs of intents that conflict with the sub-intent. For example, in FIG. 14A and FIG. 14B, step 4a, step 4b, and step 4c are performed.

Step 5: The H-IDN determines, based on feedback information reported by each L-IDN, that the intent is achieved.

If the intent is not achieved, the intent is re-decomposed. For determining, refer to a specific process in Embodiment 1. Details are not described herein again.

Step 6: The H-IDN determines a first total quantity of conflicts based on conflict intent information reported by each L-IDN, and uses an intent execution solution corresponding to intent achievement as a first execution solution. The H-IDN re-decomposes the intent to obtain a second execution solution.

Specifically, the H-IDN adjusts target values of sub-intents corresponding to some or all L-IDNs. It may be understood that the H-IDN needs to consider a capability upper limit of the sub-intent corresponding to each L-IDN, to ensure that the L-IDN can achieve the sub-intent.

Step 7: The H-IDN sends a policy modification request to the L-IDN, where the policy modification request includes a sub-intent obtained through re-decomposition. For example, in FIG. 14A and FIG. 14B, step 7a, step 7b, and step 7c are performed.

Step 8: The L-IDN sends feedback information to the H-IDN, where the feedback information includes indication information indicating whether the sub-intent determined in step 8 is achieved and conflict intent information. For example, in FIG. 14A and FIG. 14B, step 8a, step 8b, and step 8c are performed.

Step 9: The H-IDN obtains a second total quantity of conflicts corresponding to the second execution solution based on conflict intent information reported by each L-IDN in step 10. The H-IND selects an execution solution corresponding to a smaller total quantity of conflicts in the first total quantity of conflicts and the second total quantity of conflicts as a target execution solution.

It may be understood that after determining that the intent is achieved, the H-IDN may re-deliver a sub-intent for a plurality of times, to obtain a plurality of execution solutions and a total quantity of conflicts corresponding to each of the plurality of execution solutions. Further, an allocation solution with a smallest total quantity of conflicts in the plurality of execution solutions can be determined.

It may be understood that, to implement the functions in the foregoing embodiments, a network device and a terminal device include corresponding hardware structures and/or software modules for performing the functions. A person skilled in the art should be easily aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 15:
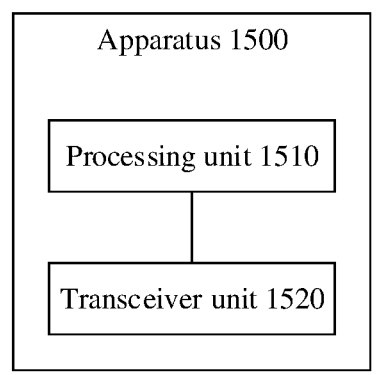
FIG. 15 is a first schematic diagram of a structure of an apparatus according to this application.
Figure 16:
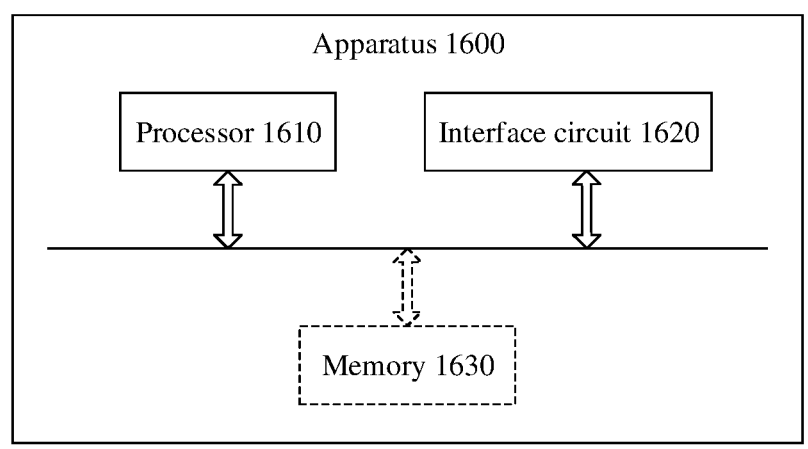
FIG. 16 is a second schematic diagram of a structure of an apparatus according to this application.

FIG. 15 and FIG. 16 are schematic diagrams of structures of possible apparatuses according to embodiments of this application. These apparatuses may be configured to implement the functions of the first network element or the second network element in the foregoing method embodiments, and therefore may also implement beneficial effects of the foregoing method embodiments. In the embodiments of this application, the apparatus may be a first network element, or may be a module (for example, a chip) in the first network element. Alternatively, the apparatus may be a module (for example, a chip) in a second network element.

As shown in FIG. 15, an apparatus 1500 includes a processing unit 1510 and a transceiver unit 1520. The apparatus 1500 is configured to implement the functions of the first network element (for example, an H-IDN) or the second network element (for example, an L-IDN) in the method embodiment shown in FIG. 5, FIG. 6A and FIG. 6B, FIG. 7A to FIG. 7C, FIG. 8A and FIG. 8B, FIG. 9, FIG. 10, FIG. 11A to FIG. 11C, FIG. 12A to FIG. 12C, FIG. 15, or FIG. 16.

When the apparatus 1500 is configured to implement the functions of the first network element in the method embodiments shown in FIG. 5, FIG. 6A and FIG. 6B, FIG. 7A to FIG. 7C, FIG. 8A and FIG. 8B, and FIG. 9, the processing unit 1510 invokes the transceiver unit 1520 to: send a first sub-intent of a first intent to a second network element; and send a second sub-intent of the first intent and indication information to the second network element, where the indication information is used to indicate that the first sub-intent and the second sub-intent have a same action and a same object.

When the apparatus 1500 is configured to implement the functions of the first network element in the method embodiments shown in FIG. 10, FIG. 11A to FIG. 11C, and FIG. 12A to FIG. 12C, the processing unit 1510 invokes the transceiver unit 1520 to: send a first sub-intent of a first intent to a second network element; and invoke a newly added interface to send a target value of a second sub-intent of the first intent and an identifier of the first sub-intent to the second network element.

When the apparatus 1500 is configured to implement the functions of the first network element in the method embodiment shown in FIG. 15 or FIG. 16, the transceiver unit 1520 is configured to receive first information from a third network element, where the first information includes first indication information and second indication information, the first indication information is used to indicate that a first sub-intent is achieved, the second indication information is used to indicate a second sub-intent that conflicts with the first sub-intent, and the first sub-intent is all sub-intents that are used to achieve an intent. The transceiver unit 1520 is configured to send a third sub-intent to the third network element, where the third sub-intent is different from the first sub-intent, and the third sub-intent is all sub-intents that are used to achieve the intent. The transceiver unit 1520 is configured to receive second information from the third network element, where the second information includes third indication information and fourth indication information, the third indication information is used to indicate that the third sub-intent is achieved, and the fourth indication information is used to indicate a fourth sub-intent that conflicts with the third sub-intent. The processing unit 1510 is configured to determine the first sub-intent as an execution solution of the intent if a total quantity of second sub-intents is less than a total quantity of fourth sub-intents. The processing unit 1510 is configured to determine the third sub-intent as the execution solution of the intent if the total quantity of second sub-intents is greater than or equal to the total quantity of fourth sub-intents.

When the apparatus 1500 is configured to implement the functions of the intent translation module or the policy management module in the second network element in the method embodiments shown in FIG. 5, FIG. 6A and FIG. 6B, FIG. 7A to FIG. 7C, FIG. 8A and FIG. 8B, FIG. 9, FIG. 10, FIG. 11A to FIG. 11C, and FIG. 12A to FIG. 12C, the transceiver unit 1520 is configured to receive a first sub-intent of a first intent from a first network element. The transceiver unit 1520 is configured to receive a second sub-intent of the first intent and indication information from the first network element, where the indication information is used to indicate that the first sub-intent and the second sub-intent have a same action and a same object. The processing unit 1510 is configured to omit translation of the second sub-intent based on the indication information.

For more detailed descriptions of the processing unit 1510 and the transceiver unit 1520, directly refer to related descriptions in the method embodiments shown in the foregoing embodiments. Details are not described herein again.

As shown in FIG. 16, an apparatus 1600 includes a processor 1610 and an interface circuit 1620. The processor 1610 and the interface circuit 1620 are coupled to each other. It may be understood that the interface circuit 1620 may be a transceiver or an input/output interface. Optionally, the apparatus 1600 may further include a memory 1630, configured to store instructions executed by the processor 1610, or input data required by the processor 1610 to run the instructions, or data generated after the processor 1610 runs the instructions.

When the apparatus 1600 is configured to implement the apparatus shown in FIG. 15, the processor 1610 is configured to implement the functions of the processing unit 1510, and the interface circuit 1620 is configured to implement the functions of the transceiver unit 1520.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

A part or all of the foregoing embodiments may be implemented through software, hardware, firmware, or any combination thereof. When software is used to implement the embodiments, a part or all of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists. A and B each may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A method, comprising:
sending, by a first network element, a first sub-intent of a first intent to a second network element; and
sending, by the first network element, a second sub-intent of the first intent and indication information to the second network element, wherein the indication information indicates that the first sub-intent and the second sub-intent have a same action and a same object.

2. The method according to claim 1, further comprising:
sending, by the first network element, an estimated quantity of times to the second network element, wherein the estimated quantity of times indicates a quantity of negotiation times of a second intent that has a same action and a same object as the first intent, and the quantity of negotiation times indicates a quantity of decomposition times of the second intent in a process of executing the second intent.

3. The method according to claim 1, further comprising:
storing, by the first network element, a quantity of negotiation times of the first intent when the first network element determines that the first intent is achieved.

4. The method according to claim 1, further comprising:
storing, by the first network element, a quantity of negotiation times of the first intent when the first network element determines that negotiation for the first intent times out.

5. The method according to claim 1, further comprising:
storing, by the first network element, a quantity of negotiation times of the first intent when the first network element determines that the first intent is deleted.

6. A method, comprising:
receiving, by a first network element, first information from a third network element, wherein the first information comprises first indication information and second indication information, the first indication information indicates that a first sub-intent is achieved, the second indication information indicates at least one second sub-intent that conflicts with the first sub-intent, and the first sub-intent is all sub-intents that are usable to achieve a first intent;

sending, by the first network element, a third sub-intent to the third network element, wherein the third sub-intent is different from the first sub-intent, and the third sub-intent is all sub-intents that are usable to achieve the first intent;

receiving, by the first network element, second information from the third network element, wherein the second information comprises third indication information and fourth indication information, the third indication information indicates that the third sub-intent is achieved, and the fourth indication information indicates at least one fourth sub-intent that conflicts with the third sub-intent; and performing the following:

determining, by the first network element, the first sub-intent as an execution solution of the intent when a total quantity of second sub-intents of the at least one second sub-intent is less than a total quantity of fourth sub-intents of the at least one fourth sub-intent; or determining, by the first network element, the third sub-intent as the execution solution of the intent when the total quantity of second sub-intents of the at least one second sub-intent is greater than or equal to the total quantity of fourth sub-intents of the at least one fourth sub-intent.

7. The method according to claim 6, wherein the method comprises:

determining, by the first network element, the first sub-intent as the execution solution of the intent when the total quantity of second sub-intents of the at least one second sub-intent is less than the total quantity of fourth sub-intents of the at least one fourth sub-intent.

8. The method according to claim 6, wherein the method comprises:

determining, by the first network element, the third sub-intent as the execution solution of the intent when the total quantity of second sub-intents of the at least one second sub-intent is greater than or equal to the total quantity of fourth sub-intents of the at least one fourth sub-intent.

9. A method, comprising:

receiving, by a second network element, a first sub-intent of a first intent from a first network element;

receiving, by the second network element, a second sub-intent of the first intent and indication information from the first network element, wherein the indication information indicates that the first sub-intent and the second sub-intent have a same action and a same object; and omitting, by the second network element, translation of the second sub-intent based on the indication information.

10. The method according to claim 9, further comprising:

determining, by the second network element, a target value of the second sub-intent based on the second sub-intent; and sending, by the second network element, an intent update request to a third network element in the second network element, wherein the intent update request comprises an identifier of a third sub-intent and the target value of the second sub-intent, and the third sub-intent is a $1^{st}$ sub-intent that is for the first intent and that is received from the first network element.

11. The method according to claim 9, further comprising:

receiving, by the second network element, an estimated quantity of times from the first network element, wherein the estimated quantity of times indicates a quantity of negotiation times of a second intent that has a same action and a same object as the first intent, and the quantity of negotiation times indicates a quantity of decomposition times of the second intent in a process of executing the second intent.

12. The method according to claim 11, further comprising:

determining, by the second network element based on a quantity of policies comprised in an available execution policy set, that the estimated quantity of times is greater than the quantity of policies, wherein the available execution policy set is determined based on a third sub-intent; and sending, by the second network element, a global intent conflict detection request to a fourth network element in the second network element, wherein the global intent conflict detection request requests to detect, for each policy in the available execution policy set, whether a sub-intent that conflicts with the policy exists in the fourth network element.

13. The method according to claim 12, further comprising:

determining, by the second network element, a first policy in an available execution measurement set based on the available execution policy set and a target value of the second sub-intent when the second sub-intent is not achieved;

determining, by the second network element based on the conflict sub-intent set, a sub-intent that conflicts with the first policy, and invoking a preset method to resolve the sub-intent that conflicts with the first policy; and sending, by the second network element, the first policy to a fourth network element in the second network element.

14. An apparatus, comprising:

a processor; and an interface circuit, wherein the interface circuit is configured to:

receive a signal from another communication apparatus and transmit the signal to the processor, or send a signal from the processor to another communication apparatus; and wherein the processor is configured to implement the method according to claim 1 by using a logic circuit or executing code instructions.

* * * * *